United States Patent
Kaneda et al.

(10) Patent No.: US 8,438,316 B2
(45) Date of Patent: May 7, 2013

(54) COMPUTER SYSTEM AND ITS RENEWAL METHOD

(75) Inventors: Yasunori Kaneda, Yokohama (JP); Yutaka Kudo, Kawasaki (JP); Yukio Ogawa, Tokyo (JP); Masakatsu Mori, Inagi (JP); Tomoki Sekiguchi, Sagamihara (JP); Masayuki Yamamoto, Sagamihara (JP); Naoto Matsunami, Hayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/457,624

(22) Filed: Apr. 27, 2012

(65) Prior Publication Data

US 2012/0215945 A1    Aug. 23, 2012

Related U.S. Application Data

(63) Continuation of application No. 12/935,365, filed as application No. PCT/JP2010/004059 on Jun. 17, 2010, now Pat. No. 8,190,789.

(51) Int. Cl.
*G06F 13/10* (2006.01)
*G06F 15/177* (2006.01)

(52) U.S. Cl.
USPC ............................ 710/8; 710/2; 710/74

(58) Field of Classification Search .................. None
See application file for complete search history.

(56) References Cited

U.S. PATENT DOCUMENTS

| | | | |
|---|---|---|---|
| 8,145,789 B1 * | 3/2012 | Stamler et al. | 709/244 |
| 2006/0045039 A1 | 3/2006 | Tsuneya et al. | |
| 2006/0168224 A1 | 7/2006 | Midgley | |
| 2007/0055840 A1 | 3/2007 | Yamamoto et al. | |
| 2007/0165659 A1 | 7/2007 | Yasuda et al. | |
| 2009/0187668 A1 | 7/2009 | Arendt et al. | |
| 2010/0146098 A1 | 6/2010 | Ishizaki et al. | |
| 2010/0223404 A1 * | 9/2010 | Butler et al. | 710/38 |
| 2011/0078303 A1 | 3/2011 | Li et al. | |

FOREIGN PATENT DOCUMENTS

| | | |
|---|---|---|
| JP | 2002-335265 A | 11/2002 |
| JP | 2006-11860 A | 1/2006 |
| JP | 2006-344091 A | 12/2006 |
| JP | 2007-72538 A | 3/2007 |
| JP | 2007-188374 A | 7/2007 |
| JP | 2008-234351 A | 10/2008 |
| JP | 2008-299791 A | 12/2008 |

* cited by examiner

*Primary Examiner* — Ilwoo Park
(74) *Attorney, Agent, or Firm* — Mattingly & Malur, PC

(57) ABSTRACT

A computer system including a management computer for managing the entire system, an integral apparatus, and a high-level connecting device for connecting the management computer and the integral apparatus is designed so that the management computer retains integral apparatus internal configuration information, configuration information about an integral apparatus to be introduced, that indicates the configuration of the integral apparatus that may possibly be introduced to the system, and lifetime information indicating lifetime of the integral apparatus; obtains connectivity guarantee information indicating whether connectivity between the computer and the storage apparatus is guaranteed or not; selects an integral apparatus to be removed from the system by referring to the lifetime information; selects an integral apparatus to be introduced to the system by referring to the integral apparatus internal configuration information, the configuration information about the integral apparatus to be introduced, and the connectivity guarantee information.

9 Claims, 44 Drawing Sheets

FIG.8

| OPERATION START DATE AND TIME | 2005.4.1 |
|---|---|
| SPECIFIED APPARATUS LIFETIME | 5 years |
| ACTUAL OPERATING TIME | 30012 hours |
| SPECIFIED OPERATING TIME | 30000 hours |

LIFETIME INFORMATION

FIG.9A

| INTEGRAL APPARATUS MODEL | COMPONENTS | | | | |
|---|---|---|---|---|---|
| | TYPE | MODEL | NUMBER OF MOUNTED COMPONENTS | INFORMATION ABOUT EACH TYPE | |
| 10 | CONNECTING DEVICE | 200 | 1 | NUMBER OF CONNECTIONS WITH EXTERNAL CONNECTING DEVICES | 4 |
| | COMPUTER | 300 | 4 | NORMALIZED COMPUTER POWER | 32 (4x 8) |
| | STORAGE APPARATUS | 100 | 1 | STORAGE CAPACITY | 50TB |
| | TOPOLOGY INFORMATION | 200 connected to four 300s connected to 100 | | | |

INTEGRAL APPARATUS INTERNAL CONFIGURATION INFORMATION

INTEGRAL APPARATUS INTERNAL CONFIGURATION INFORMATION

INTER-INTEGRAL-APPARATUS CONNECTION INFORMATION

FIG.11

| VIRTUAL COMPUTER NUMBER | COMPUTER NUMBER | STORAGE AREA NUMBER | STORAGE APPARATUS NUMBER | LATENCY POLICY |
|---|---|---|---|---|
| 30001 | 300a | 10001 | 100 | |
| 30002 | 300a | 10002 | 100 | |
| 30003 | 300a | 10003 | 100 | |
| 30004 | 300b | 10004 | 100 | |
| 30005 | 300b | 10005 | 100 | |
| 30006 | 300b | 10006 | 100 | |
| 30007 | 300c | 11007 | 100' | |
| 30008 | 300c | 11008 | 100' | |
| 30009 | 300d | 10009 | 100 | WITHIN INTEGRAL APPARATUS |
| 31001 | 300'a | 11001 | 100' | |
| 31002 | 300'a | 11002 | 100' | |
| 31003 | 300'a | 11003 | 100' | |
| 31004 | 300'b | 11004 | 100' | |
| 31005 | 300'b | 11005 | 100' | |
| 31006 | 300'b | 11006 | 100' | |
| 31007 | 300'c | 10007 | 100 | |
| 31008 | 300'c | 10008 | 100 | |
| 31009 | 300'd | 11009 | 100' | WITHIN INTEGRAL APPARATUS |

CONNECTING PATH INFORMATION

FIG.12

| DATA PROCESSING NUMBER | PROCESS NUMBER | VIRTUAL COMPUTER / STORAGE AREA | MEASURED ITEMS | CHRONOLOGICAL INFORMATION ||||
|---|---|---|---|---|---|---|---|
| | | | | 2010.5.4 10:02 | 2010.5.4 10:01 | 2010.5.4 10:00 | ... |
| 90000 | 90001 | VIRTUAL COMPUTER 30009 | CPU LOAD FACTOR [%] | 62% | 60% | 90% | ... |
| | | | NORMALIZED COMPUTER POWER | 6 | 6 | 4 | ... |
| | | STORAGE AREA 10009 | USED CAPACITY | 805GB | 802GB | 800GB | ... |
| 91000 | 91001 | VIRTUAL COMPUTER 30001 | CPU LOAD FACTOR [%] | 48% | 45% | 90% | ... |
| | | | NORMALIZED COMPUTER POWER | 1 | 1 | 1 | ... |
| | | STORAGE AREA 10001 | USED CAPACITY | 202GB | 201GB | 200GB | ... |
| | 91002 | VIRTUAL COMPUTER 30002 | CPU LOAD FACTOR [%] | 48% | 45% | — | ... |
| | | | NORMALIZED COMPUTER POWER | 1 | 1 | — | ... |
| | | STORAGE AREA 10002 | USED CAPACITY | 11GB | 10GB | — | ... |

UTILIZATION RATE INFORMATION

INTERNAL CONFIGURATION INFORMATION ABOUT
INTEGRAL APPARATUS TO BE INTRODUCED

INTERNAL CONFIGURATION INFORMATION ABOUT
INTEGRAL APPARATUS TO BE INTRODUCED

FIG. 13C

| INTEGRAL APPARATUS MODEL | COMPONENTS | | | | |
|---|---|---|---|---|---|
| | TYPE | MODEL | NUMBER OF MOUNTED COMPONENTS | INFORMATION ABOUT EACH TYPE | |
| 13 | CONNECTING DEVICE | 200" | 1 | NUMBER OF CONNECTIONS WITH EXTERNAL CONNECTING DEVICES | 4 |
| | COMPUTER | 300" | 8 | NORMALIZED COMPUTER POWER | 128 (8x16) |
| | STORAGE APPARATUS | 100" | 1 | STORAGE CAPACITY | SSD 10TB |
| | TOPOLOGY INFORMATION | 200" / 300" 300" 300" 300" / 100" | | | |

INTERNAL CONFIGURATION INFORMATION ABOUT
INTEGRAL APPARATUS TO BE INTRODUCED

INTERNAL CONFIGURATION INFORMATION ABOUT
INTEGRAL APPARATUS TO BE INTRODUCED

FIG.13E

| INTEGRAL APPARATUS MODEL | COMPONENTS ||||
|---|---|---|---|---|
| | TYPE | MODEL | NUMBER OF MOUNTED COMPONENTS | INFORMATION ABOUT EACH TYPE ||
| 15 | CONNECTING DEVICE | | | NUMBER OF CONNECTIONS WITH EXTERNAL CONNECTING DEVICES | |
| | COMPUTER | | | NORMALIZED COMPUTER POWER | |
| | STORAGE APPARATUS | *100"* | 1 | STORAGE CAPACITY | *400TB* |
| | TOPOLOGY INFORMATION | *100"* ||||

INTERNAL CONFIGURATION INFORMATION ABOUT
INTEGRAL APPARATUS TO BE INTRODUCED

FIG.14

| DATA PROCESSING NUMBER | LATENCY POLICY | NORMALIZED COMPUTER POWER | STORAGE CAPACITY | REQUIRED QUANTITY |
|---|---|---|---|---|
| 92000 | NONE | 4 | 1TB | 50 |
| 93000 | WITHIN INTEGRAL APPARATUS | 16 | 2TB | 8 |

EXTENSION PLAN INFORMATION

| | | CONNECTING SIDE | | |
|---|---|---|---|---|
| | | COMPUTER 300' | COMPUTER 300 | COMPUTER 300" |
| CONNECTED SIDE | STORAGE APPARATUS 100' | ○ | × | × |
| | STORAGE APPARATUS 100 | × | ○ | ○ |
| | STORAGE APPARATUS 100" | × | ○ | ○ |

(b)

| | | CONNECTING SIDE | | |
|---|---|---|---|---|
| | | STORAGE APPARATUS 100' | STORAGE APPARATUS 100 | STORAGE APPARATUS 100" |
| CONNECTED SIDE | STORAGE APPARATUS 100' | ○ | × | × |
| | STORAGE APPARATUS 100 | × | ○ | ○ |
| | STORAGE APPARATUS 100" | × | ○ | ○ |

CONNECTIVITY GUARANTEE INFORMATION

FIG.21

| VIRTUAL COMPUTER NUMBER | COMPUTER NUMBER | VIRTUAL COMPUTER NUMBER | COMPUTER NUMBER | STORAGE AREA NUMBER | STORAGE APPARATUS NUMBER | COEXISTENCE POLICY |
|---|---|---|---|---|---|---|
| 32001 | 300aa | 33001 | 300ca | 13001 | 100c | COEXISTENCE IMPOSSIBLE |
| | | 33002 | 300bb | 13002 | 100b | |
| | | ∶ | | | | |

CONNECTING PATH INFORMATION

FIG.23

| VIRTUAL COMPUTER NUMBER | COMPUTER NUMBER | STORAGE AREA NUMBER | STORAGE APPARATUS NUMBER | STORAGE AREA NUMBER | STORAGE APPARATUS NUMBER | STORAGE TIER POLICY |
|---|---|---|---|---|---|---|
| 34001 | 300ba | 14001 | 100b | | | Tier 1 |
| | | 14002 | 100b | 14012 | 100b | Tier 2 |
| | | .. | | | | |

CONNECTING PATH INFORMATION

| | | CONNECTING SIDE | | | |
|---|---|---|---|---|---|
| | | COMPUTER 300a | COMPUTER 300b | COMPUTER 300c | COMPUTER 300d |
| CONNECTED SIDE | STORAGE APPARATUS 100a | ○ | ○ | ○ | ○ |
| | STORAGE APPARATUS 100b | ○ | ○ | ○ | ○ |
| | STORAGE APPARATUS 100c | × | × | ○ | ○ |
| | STORAGE APPARATUS 100d | × | × | ○ | ○ |

(b)

| | | CONNECTING SIDE | | | |
|---|---|---|---|---|---|
| | | STORAGE APPARATUS 100a | STORAGE APPARATUS 100b | STORAGE APPARATUS 100c | STORAGE APPARATUS 100d |
| CONNECTED SIDE | STORAGE APPARATUS 100a | ○ | ○ | ○ | ○ |
| | STORAGE APPARATUS 100b | ○ | ○ | ○ | ○ |
| | STORAGE APPARATUS 100c | ○ | ○ | ○ | ○ |
| | STORAGE APPARATUS 100d | ○ | ○ | ○ | ○ |

CONNECTIVITY GUARANTEE INFORMATION

COMPUTER SYSTEM AND ITS RENEWAL METHOD

CROSS-REFERENCES

This application is a continuation application of U.S. Ser. No. 12/935,365, filed Sep. 29, 2010, the entire contents of which are hereby incorporated by reference.

TECHNICAL FIELD

The present invention relates to a computer system and its renewal method. Particularly, this invention is suited for use in a computer system equipped with an integral apparatus.

BACKGROUND ART

With the spread of the Internet and the like, consolidation and scale expansion of computer systems in companies have been being promoted. Therefore, an apparatus and operation management method for efficiently constructing and operating the computer systems whose scale is being expanded is important. A computer system is constituted from a computer for processing information, a storage apparatus for storing programs and data used by the computer, a connecting device for establishing connections between the computer and the computer, between the computer and the storage apparatus, and also with an external network, and the connection (network).

Regarding this computer system including a computer, a storage apparatus, and a connecting device, there is a known technique relating to electric power saving in operation by setting support by means of cooperation between a plurality of apparatuses and realization of consistency in settings by having a management computer control each of the computer, the storage apparatus, and the connecting device as described in Patent Literature 1.

CITATION LIST

Patent Literature

[PTL 1]
Japanese Patent Application Laid-Open (Kokai) Publication No. 2002-335265

SUMMARY OF INVENTION

Technical Problem

It has been necessary to select, introduce, and mutually connect (establish a network between) the above-mentioned three major apparatuses (a computer, a storage apparatus, and a connecting device) in order to construct a computer system. A person in charge of operation of the computer system and a system administrator who select and introduce the apparatuses need to consider in what allocation they should purchase these three kinds of apparatuses, how the apparatuses should be connected, whether or not the purchased apparatuses can be connected and used without any trouble, and how programs, data, and virtual computers should be located in the purchased apparatuses; and the person in charge of operation and the system administrator are required to have a high level of expertise. Accordingly, there is a problem of a heavy burden of requirement on the person in charge of operation and the system administrator.

In relation to the above-described problem, an integral apparatus in which a computer, a storage apparatus, and a connecting device are assembled in advance has been being used recently. A company (vendor) provides the integral apparatus by connecting the computer, the storage apparatus, and the connecting device in an integrated manner in advance, so that they guarantee that the purchased apparatus can be connected and used without any trouble. Furthermore, additions can be made to the system and the system can be enhanced sequentially by connecting the purchased apparatus only to an external connecting device. The burden on the person in charge of operation and the system administrator who construct the computer system to construct a large-scale computer system can be reduced by constructing the large-scale computer system using a plurality of integral apparatuses.

However, problems of such a large-scale computer system using the above-described integral apparatuses are that it is necessary to consider what type of configuration of the integral apparatus should be purchased and how programs, data, and virtual computers should be located in the computer system constituted from a plurality of integral apparatuses and operation management procedures different from conventional operation management procedures, by which the computer, the storage apparatus, and the connecting device are introduced separately, are required.

Since the computer, the storage apparatus, and the connecting device are connected in advance in the integral apparatus, it is guaranteed that the purchased apparatus can be used without any trouble; however, no consideration is given to connectivity between different types or generations of integral apparatuses. If the lifetime of a computer system (as a specific example, a data center and the like) is longer than that of an integral apparatus, there is a possibility that different types or generations of integral apparatuses may exist. In this case, it is necessary to consider how programs, data, and virtual storage apparatuses should be located in consideration of the different types or generations of integral apparatuses. Specifically speaking, if programs, data, and virtual storage apparatuses are located according only to the connectivity guaranteed within the integral apparatus, there is a problem of difficulty in increasing a utilization rate of the computer and the storage apparatus.

The present invention was devised in light of the circumstances described above and aims at facilitating the system configuration and renewal of a large-scale computer system constructed by using integral apparatuses.

Solution to Problem

In order to solve the problems described above, a computer system including a management computer for managing the entire system, an integral apparatus, and a high-level connecting device for connecting the management computer and the integral apparatus is provided according to this invention, wherein the integral apparatus includes: a computer for executing various processing sequences according to implemented application software; a storage apparatus from or to which the computer reads or writes data; and a low-level connecting device for connecting the computer, the storage apparatus, and the high-level connecting device; and a set of the computer, the storage apparatus, and the low-level connecting device can be attached to, or removed from, the system; and wherein the management computer retains integral apparatus internal configuration information indicating the configuration of the integral apparatus, configuration information about an integral apparatus to be introduced, that indicates the configuration of the integral apparatus that may possibly be introduced to the system, and lifetime information indicating lifetime of the integral apparatus; obtains connectivity guarantee information indicating whether connectivity between the computer and the storage apparatus is guaranteed or not; selects an integral apparatus to be removed from the system by referring to the lifetime information; selects an integral apparatus to be introduced to the system by referring to the integral apparatus internal configuration information, the configuration information about the integral apparatus to be introduced, and the connectivity guarantee information; and outputs information about the selected integral apparatus to be removed and the selected integral apparatus to be introduced.

Also, a method for renewing a computer system including a management computer for managing the entire system, an integral apparatus, and a high-level connecting device for connecting the management computer and the integral apparatus is provided according to this invention, wherein the integral apparatus includes: a computer for executing various processing sequences according to implemented application software; a storage apparatus from or to which the computer reads or writes data; and a low-level connecting device for connecting the computer, the storage apparatus, and the high-level connecting device; and a set of the computer, the storage apparatus, and the low-level connecting device can be attached to, or removed from, the system; and wherein the management computer retains integral apparatus internal configuration information indicating the configuration of the integral apparatus, configuration information about an integral apparatus to be introduced, that indicates the configuration of the integral apparatus that may possibly be introduced to the system, and lifetime information indicating lifetime of the integral apparatus; obtains connectivity guarantee information indicating whether connectivity between the computer and the storage apparatus is guaranteed or not; and includes a first step of selecting an integral apparatus to be removed from the system by referring to the lifetime information, a second step of selecting an integral apparatus to be introduced to the system by referring to the integral apparatus internal configuration information, the configuration information about the integral apparatus to be introduced, and the connectivity guarantee information, and a third step of outputting information about the selected integral apparatus to be removed and the selected integral apparatus to be introduced.

Advantageous Effects of Invention

When sequentially renewing old apparatuses to new apparatuses in, or simply adding and introducing an apparatus to, a large-scale computer system configured by using integral apparatuses according to this invention, an integral apparatus to be added and introduced can be automatically selected, so that the burden on a person in charge of operation or a system administrator can be reduced.

Furthermore, this invention can automatically migrate programs, data, a virtual computer(s), and volumes when adding and introducing an integral apparatus and removing an old apparatus, so that the burden on the person in charge of operation or the system administrator can be reduced.

BRIEF DESCRIPTION OF DRAWINGS

FIG. 8 is a conceptual diagram showing a configuration example for lifetime information.

FIG. 9a is a conceptual diagram showing a configuration example for integral apparatus internal configuration information.

FIG. 11 is a conceptual diagram showing a configuration example for connecting path information according to the first embodiment.

FIG. 12 is a conceptual diagram showing a configuration example for utilization rate information.

FIG. 13c is a conceptual diagram showing a configuration example for the internal configuration information about an integral apparatus to be introduced.

FIG. 13e is a conceptual diagram showing a configuration example for the internal configuration information about an integral apparatus to be introduced.

FIG. 14 is a conceptual diagram showing a configuration example for extension plan information.

FIGS. 17 (a) and 17 (b) are conceptual diagrams showing configuration examples for connectivity guarantee information according to the first embodiment.

FIG. 21 is a conceptual diagram showing a configuration example for connecting path information according to the second embodiment.

FIG. 23 is a conceptual diagram showing a configuration example for connecting path information according to the third embodiment.

FIGS. 26 (a) and 26 (b) are block diagrams showing configuration examples for connectivity guarantee information according to the fourth embodiment.

DESCRIPTION OF EMBODIMENTS

Figure 1:
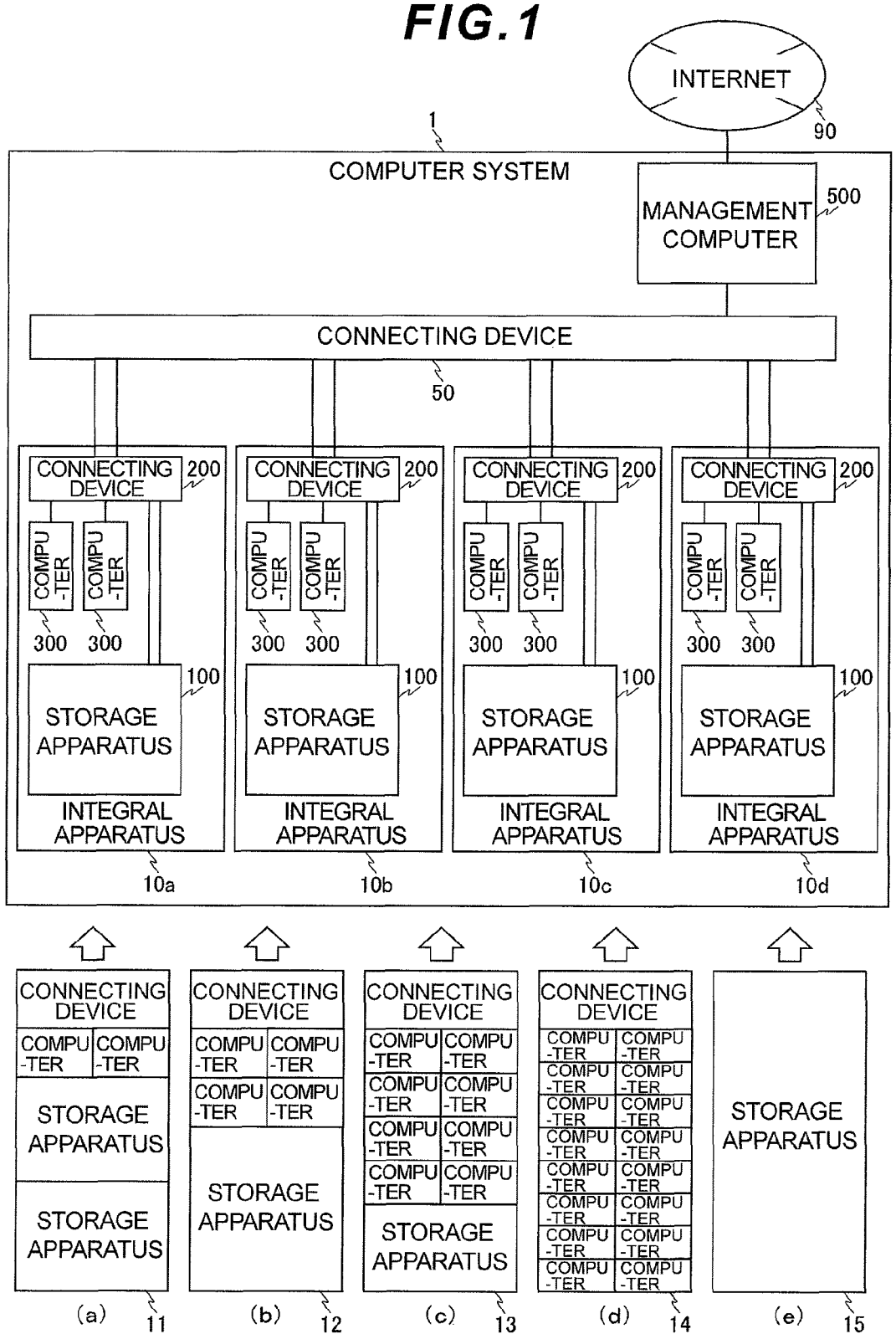
FIG. 1 is a block diagram showing the overall configuration of a computer system according to a first embodiment.

The present invention will be explained below with reference to the attached drawings. It should be noted that, as a general rule, elements that have the same structural part and to which the same reference numeral is assigned performs the same operation in the following embodiments.

(1) First Embodiment

FIG. 1 shows the overall configuration of a computer system 1 according to this embodiment. The computer system 1 shown in FIG. 1 is constructed by using a plurality of integral apparatuses 10 (10a to 10d). Each integral apparatus 10 is connected via a connecting device 200 in the integral apparatus 10 to a connecting device 50. As a result, the plurality of integral apparatuses 10 can access each other via the connecting device 50.

Incidentally, the integral apparatus hereinafter means an apparatus equipped with a computer(s), a storage apparatus(es), and a connecting device, regarding which connectivity is guaranteed in advance. The computer(s), the storage apparatus(es), and the connecting device may be placed in the same chassis or formed separately as long as they are treated as one unit as a whole. Specifically speaking, for example, a form in which the computer(s), the storage apparatus(es), and the connecting device are treated physically as one unit is possible.

A management computer 500 for managing the integral apparatuses 10 is connected via the connecting device 50 to the integral apparatuses 10, so that the management computer 500 can communicate with each apparatus/device included in the integral apparatuses 10. The management computer 500 is also connected to the Internet 90 so that it can obtain various pieces of information provided via the Internet 90. Incidentally, the management computer 500 may be located so that it is connected via the Internet 90 to the connecting device 50. A client(s) will be connected via the Internet 90 to the computer system 1.

The integral apparatus 10 according to this embodiment includes: one or more computers 300 for executing various processing sequences according to a user's business activities based on implemented application software; one or more storage apparatuses 100 from or to which the computer 300 reads or writes data; a low-level connecting device 200 (hereinafter simply referred to as the "connecting device 200") for connecting the storage apparatus 100 to a high-level connecting device 50 (hereinafter simply referred to as the "connecting device 50"). Connections are established via the connecting device 200 between the computers 300 and the storage apparatus 100 and between the computers 300. The computer 300 can access the storage apparatus 100 in the integral apparatus 10 via the connecting device 200 in its integral apparatus; however, in order to access the storage apparatus 100 in another integral apparatus, the computer 300 accesses that storage apparatus 100 via the connecting device 200 in the integral apparatus 10 in which the computer 30 exists, the connecting device 50, and then the connecting device 200 in the other integral apparatus.

Figure 2:
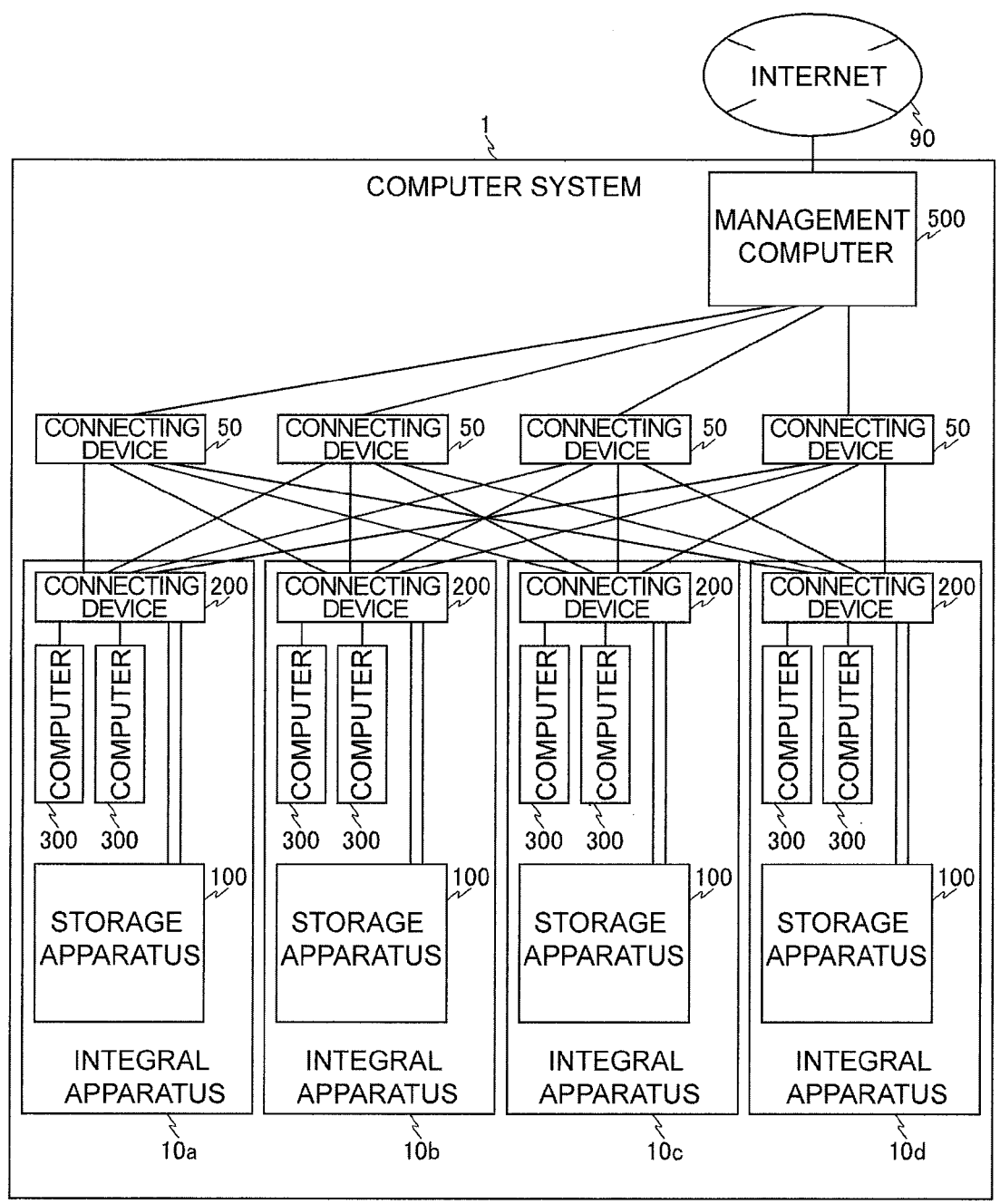
FIG. 2 is a block diagram showing another configuration example for the computer system according to the first embodiment.

FIG. 2 shows a configuration example in which a plurality of connecting devices 50 are used instead of the connecting device 50 shown in FIG. 1 to connect a plurality of integral apparatuses 50 so that each integral apparatus 50 can communicate with other integral apparatuses 50. In this configuration example, a communication network equivalent to the connecting device 50 shown in FIG. 1 is constructed by connecting the connecting device 200 in each integral apparatus 10 with each connecting device 50 in a mesh configuration. Therefore, even when the communication network connecting the integral apparatuses 10 is required to have high performance, for example, when adding an integral apparatus 10, it is possible to dynamically respond to the requirement by adding a connecting device 50 outside the integral apparatuses 10. Furthermore, FIG. 2 shows that the plurality of connecting devices 50 are configured in one tier; however, the plurality of connecting devices 50 can be configured in multiple tiers so that an integral apparatus(es) 10 can be added flexibly. Furthermore, functions of the multiple-level connecting devices may be divided according to different levels and, a network hierarchical structure may be divided according to different levels, for example, level 2 and level 3, so that the connecting devices 50 can be constructed and assigned different functions, thereby increasing extensibility of the computer system 1.

Figure 3:
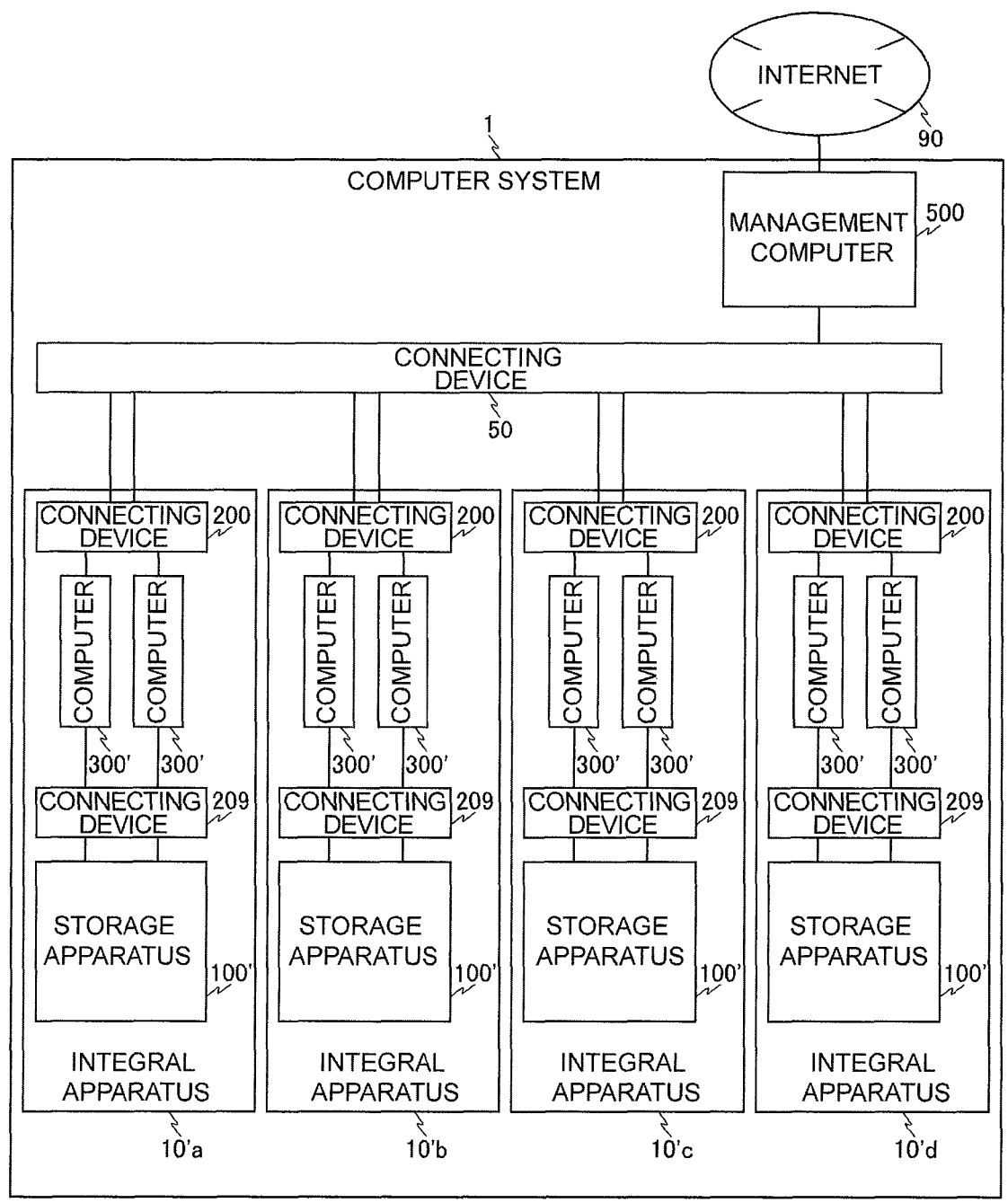
FIG. 3 is a block diagram showing another configuration example for the computer system according to the first embodiment.

FIG. 3 shows a form in which two connecting devices, that is, a connecting device 209, which connects a computer 300' and a storage apparatus 100', and the connecting device 200, which connects the computers 300' and is connected to the external connecting device 50, are used. When a computer 300' in an integral apparatus 10' (10'*a* to 10'*d*) accesses a storage apparatus 100' in that integral apparatus 10', it does not make access via the connecting device 200 used when accessing another integral apparatus 10'. So, it is possible to enhance access performance from the computer 300' to the storage apparatus 100' as compared to the configuration of FIG. 1. On the other hand, since the storage apparatus 100' is not directly connected to the connecting device 200, when a computer 300' in another integral apparatus 10' accesses the above-mentioned storage apparatus 100', it accesses that storage apparatus 100 via the computer 300' in the integral apparatus 10' to which that storage apparatus 100' belongs.

This embodiment provides a method for selecting an integral apparatus 10 and a method for migrating programs, data, and a virtual computer when removing an old integral apparatus 10 from, and introducing a new integral apparatus 10 to, the computer system 1 constituted from the integral apparatuses 10 described above.

For example, FIG. 1 shows a case where the integral apparatus 10*a* is removed and a new integral apparatus is introduced. Variations are prepared for an integral apparatus to be introduced. Candidates of the integral apparatus to be introduced includes, as shown in FIG. 1: (a) an integral apparatus 11 including one connecting device, two computers, and two storage apparatuses; (b) an integral apparatus 12 including one connecting device, four computers, and one storage apparatus; (c) an integral apparatus 13 including one connecting device, eight computers, and one storage apparatus; and (d) an integral apparatus 14 including one connecting device and sixteen computers. In addition to the above-described four types of integral apparatuses 11 to 14, there is another candidate to be added, that is, (e) an integral apparatus 15 including only a plurality of storage apparatuses.

In the internal configurations (a) to (c), a connecting device, computers, and a storage apparatus(es) always exist. For example, if a large amount of data operation is required when adding the above-mentioned types of integral apparatuses 11 to 13, it is only necessary to select an integral apparatus including a high percentage of computers; and if a large amount of power is not required for data operation and an amount of data to be stored is large, it is only necessary to select an integral apparatus including a high percentage of storage apparatuses. In the integral configuration (d), only the computers and the connecting device are located and no storage apparatus is located. So, this integral configuration 14 is selected when enhancing only the computer power. When storing data, a storage apparatus included in another integral apparatus will be used. Incidentally, from a different point of view, the integral configurations (a) to (d) are designed so that communication is performed between the computers and the storage apparatus(es) or between the computers in the same integral apparatus 11 to 14, the connecting device is included in the integral apparatus.

Regarding the integral configuration shown in (e), one storage apparatus constitutes the integral apparatus, which is accessed only by the computers existing in other integral apparatuses. Therefore, this integral configuration (e) does not require a connecting device.

The above-described pluralities of variations are prepared in advance by a vendor who provides integral apparatuses; and when adding an integral apparatus to the computer system 1, a user can select an integral apparatus to be added from among these variations (or series). Accordingly, the user does not have to decide the computers, storage apparatus(es), and connecting device individually, so that the user's labor required to make such a decision can be reduced.

In this embodiment, each of these variations of integral apparatuses is a unit to be added to the computer system 1 or a unit to be removed from the computer system 1 and addition or removal of an integral apparatus(es) to or from the computer system 1 is managed based on this unit. The vendor provides these integral apparatuses, each constituted from a plurality of various equipment; manages the integral apparatus by using miscellaneous characteristics such as computer power, the storage capacity of the storage apparatus(es), useful life of equipment, topology within the equipment, and the number of external connections (the above-listed characteristics will be explained later); and further guarantees the integral apparatuses in terms of the characteristics. Therefore, the burden on the user who manages the computer system in managing individual apparatuses/devices in the integral apparatuses will be reduced and the management of the whole computer system will become easier by using the integral apparatuses provided by the vendor.

The computer system 1 according to this embodiment is configured so that a plurality of integral apparatuses, which are provided by the vendor and regarding which connectivity between devices/apparatuses in each integral apparatus is guaranteed, are connected to each other under the control of the user by using a connecting device outside the integral apparatuses, thereby configuring the computer power and storage capacity as desired by the user.

Figure 4A:
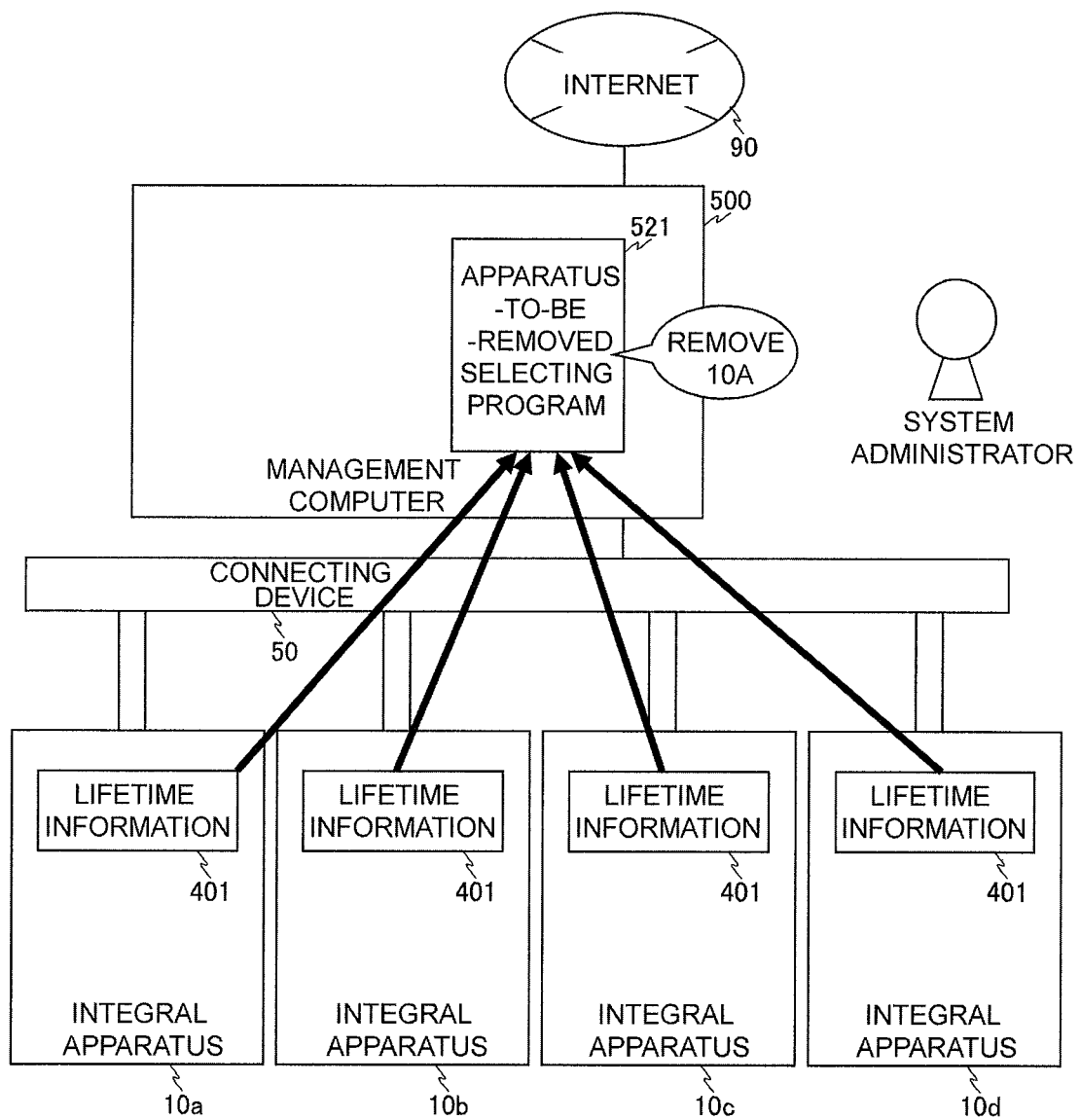
FIG. 4a is a block diagram showing a processing sequence for integral apparatus replacement processing.

FIG. 4*a* to FIG. 4*f* show procedures for renewing the integral apparatuses in the computer system 1. An apparatus-to-be-removed selecting program 521 for the management computer 500 obtains lifetime information 401 from each apparatus/device in the integral apparatuses and extracts an integral apparatus to be removed (FIG. 4*a*).

Figure 4B:
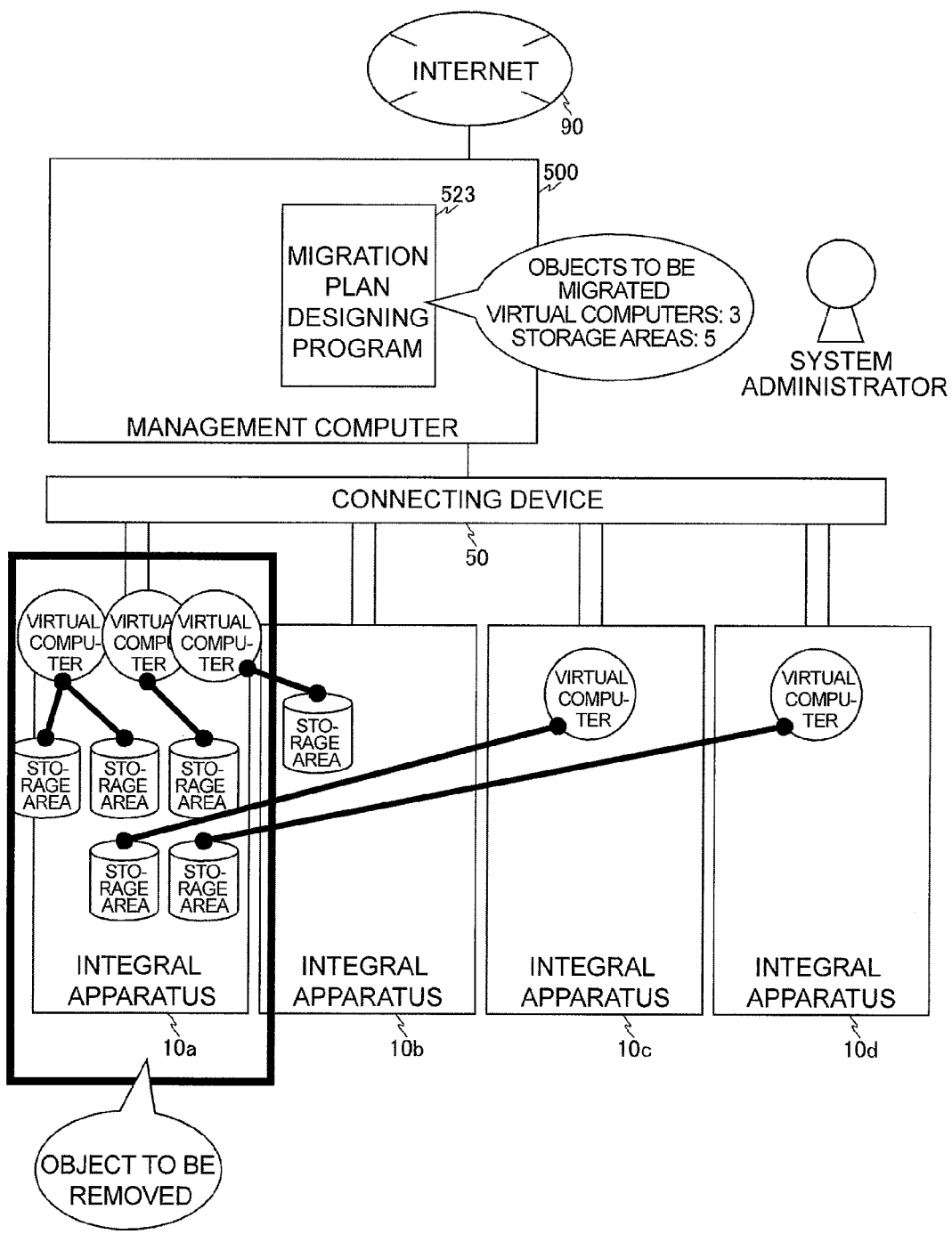
FIG. 4b is a block diagram showing a processing sequence for the integral apparatus replacement processing.

Next, a migration plan designing program 523 for the management computer 500 refers to connecting path information 410 retained by the management computer 500 and extracts virtual computers and storage areas included in the integral apparatus to be removed (FIG. 4*b*).

Figure 4C:
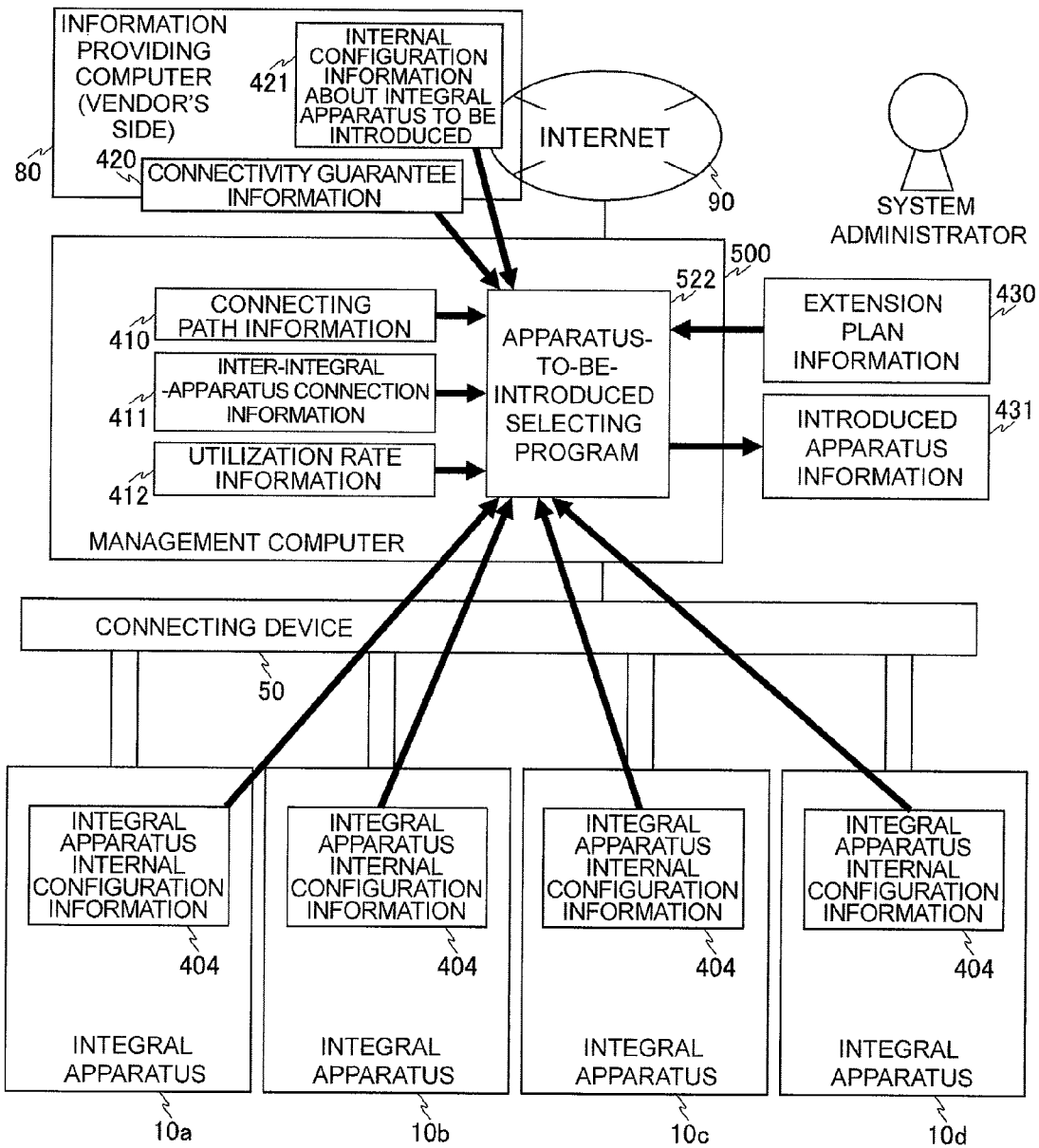
FIG. 4c is a block diagram showing a processing sequence for the integral apparatus replacement processing.

Subsequently, an apparatus-to-be-introduced selecting program 522 for the management computer 500 obtains integral apparatus internal configuration information 404 from each integral apparatus; selects an integral apparatus 11 to 14 or a storage apparatus 15 to be introduced according to inter-integral-apparatus connection information 411, connecting path information 410, and utilization rate information 412 retained by the management computer 500, connectivity guarantee information 420 and internal configuration information about an integral apparatus to be introduced 421, which are externally obtained from, for example an information providing computer 80 on the vendor's side, and extension plan information 430 obtained from a system administrator; and presents introduced apparatus information 431 to the system administrator (FIG. 4*c*). Incidentally, the number of vendors who provide integral apparatuses should not necessarily be limited to one vendor. If another vendor can provide information, such as the integral apparatus internal configuration information 404 and the connectivity guarantee information 420, used to select an integral apparatus to be added to the computer system, which integral apparatus should be a candidate to be added may be determined by using the provided information; and integral apparatuses provided by the other vendor may be considered as objects to be selected if they could satisfy the conditions.

Figure 4D:
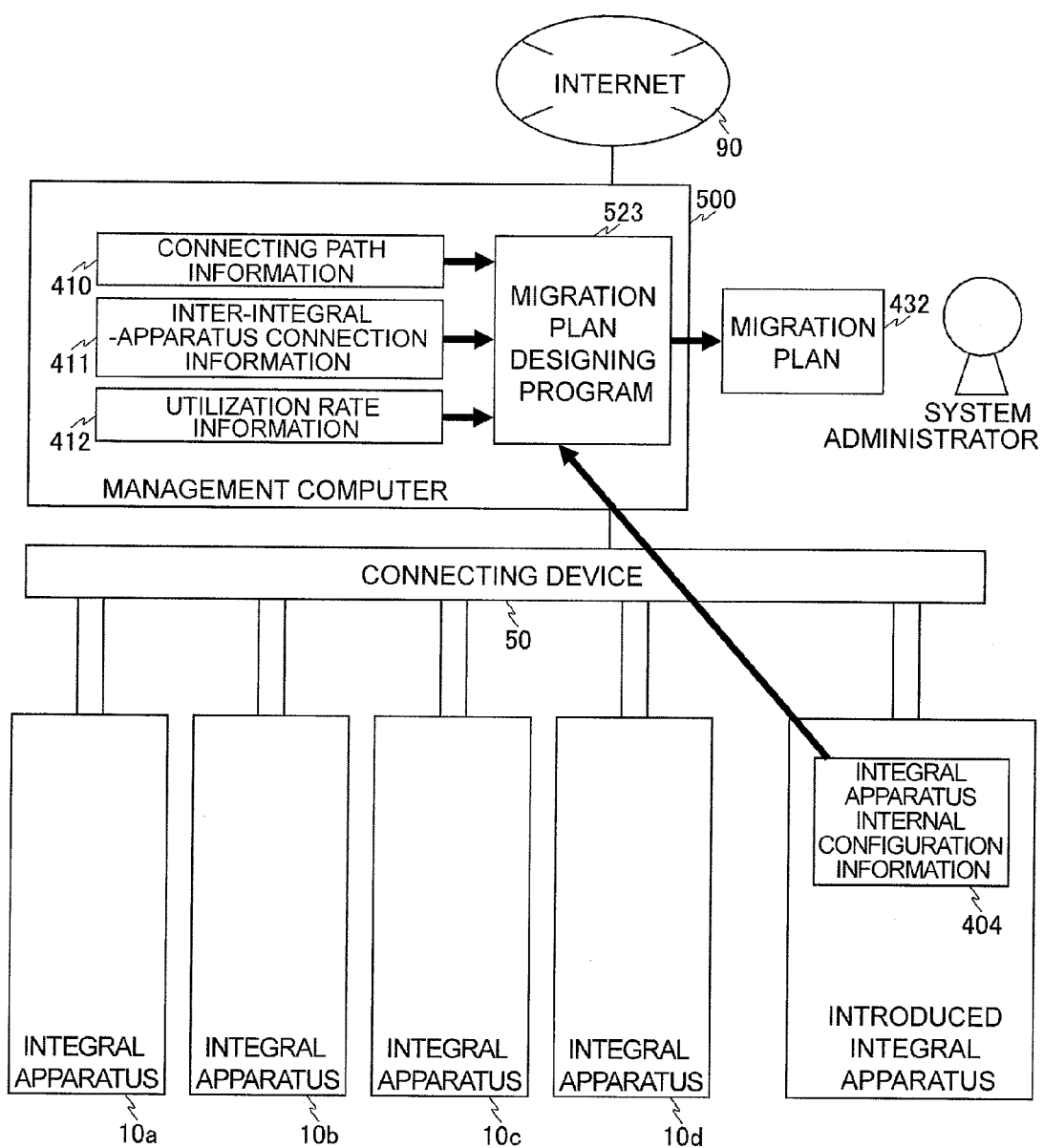
FIG. 4d is a block diagram showing a processing sequence for the integral apparatus replacement processing.

The migration plan designing program 523 for the management computer 500 always monitors a new integral apparatus being connected to the computer system. If the migration plan designing program 523 detects a new integral apparatus being connected, it obtains the integral apparatus internal configuration information 404 from each integral apparatus (including the newly connected integral apparatus) and updates the inter-integral-apparatus connection information 411 retained by the management computer 500. Furthermore, a migration plan 432 for virtual computers on the computer 300 in the integral apparatus to be removed and storage areas in the storage apparatus 100 is designed based on the connecting path information 410, the utilization rate information 412 and the connectivity guarantee information 420 as well as the extension plan information 430 obtained from the system administrator (FIG. 4d).

Figure 4E:
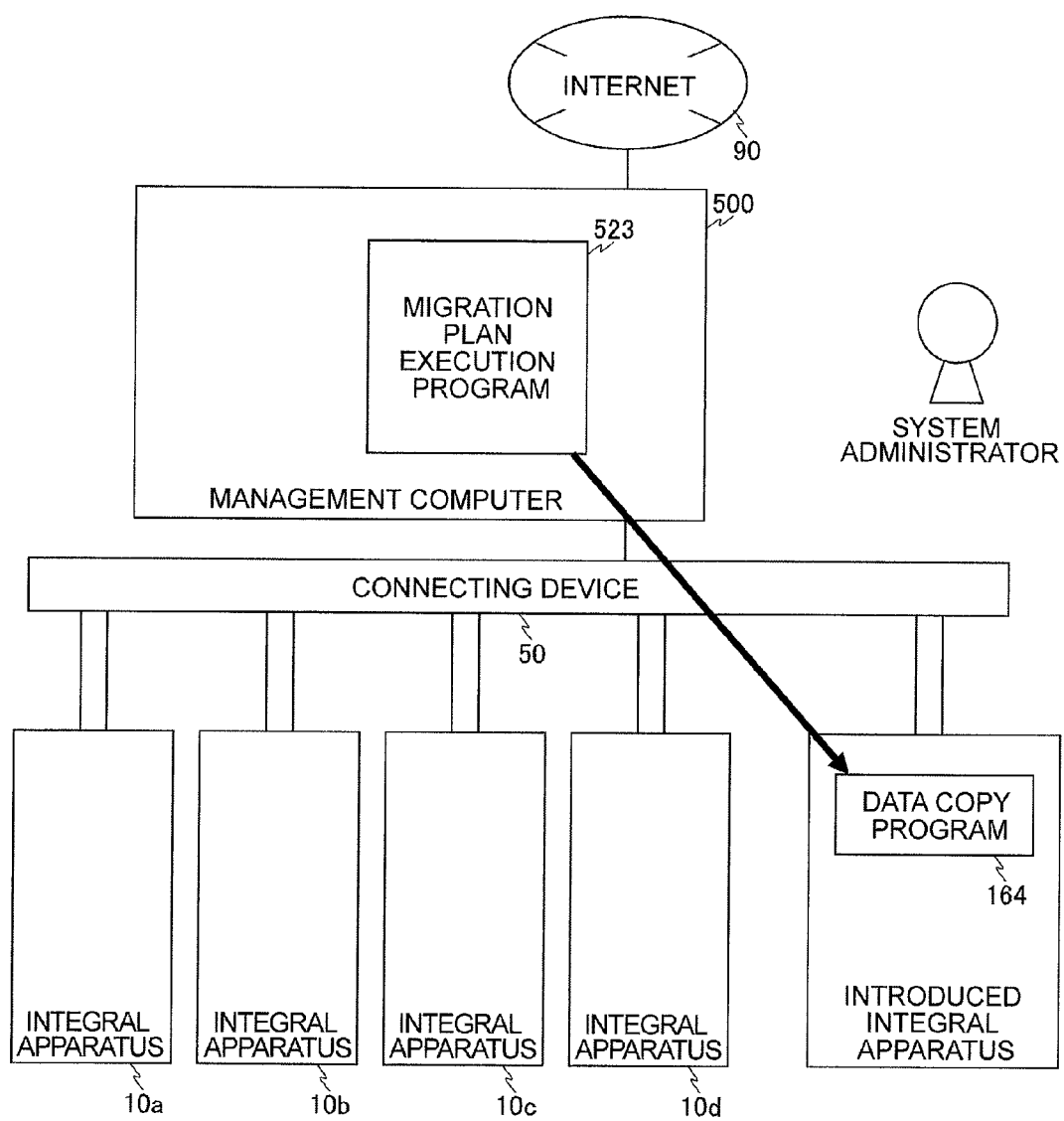
FIG. 4e is a block diagram showing a processing sequence for the integral apparatus replacement processing.

If the migration plan is approved by the system administrator, the migration plan designing program 523 for the management computer 500 activates a migration plan execution program 524 and starts migrating the virtual computers and the storage areas (FIG. 4e).

Figure 4F:
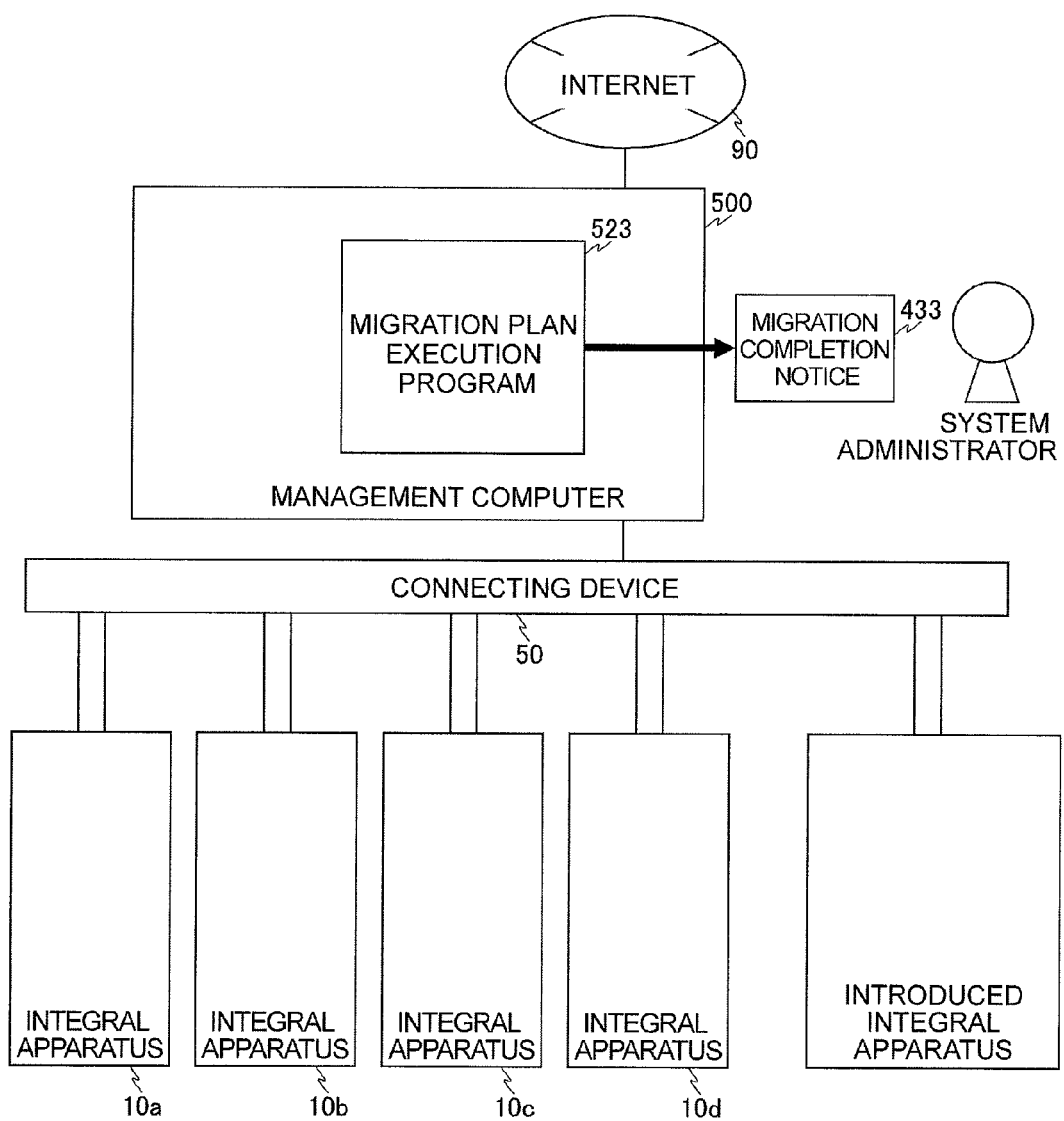
FIG. 4f is a block diagram showing a processing sequence for the integral apparatus replacement processing.

When migration of all the virtual computers and the storage areas from the integral apparatus to be removed is completed, that integral apparatus can be removed and the management computer 500 sends a migration completion notice 433 to the system administrator to notify him/her that the relevant integral apparatus can be removed (FIG. 4f). As a result, the system administrator removes the integral apparatus according to the migration completion notice 433.

Incidentally, if the virtual computers and the storage areas are migrated, the management computer 500 manages the post-migration positions of the virtual computers and the storage areas and sorts commands, which are given from clients via the Internet 90, into the integral apparatuses which are destinations of the commands.

As a result of the above-described processing, an integral apparatus can be automatically selected in the computer system equipped with the integral apparatuses, so that the system administrator's burden can be reduced. Furthermore, the storage areas and the virtual computers can be automatically migrated as a result of removal and introduction of an integral apparatus, so that the system administrator's burden can be reduced.

The above-mentioned procedure has been explained by taking, as an example, removal and introduction of an integral apparatus as triggered by the integral apparatus lifetime information 401. Similarly, this invention can be applied to extension of the computer system by addition of an integral apparatus without removal of an integral apparatus. In this case, the above-mentioned procedure is triggered by acquisition of extension plan information 430 by the apparatus-to-be-introduced selecting program 523 for the management computer 500. This invention can also be applied to extension of the computer system in order to deal with deficiency in computer resources (computer power) or deficiency in the storage capacity. In this case, the extension of the computer system is triggered by the utilization rate information 412.

Also, the above-mentioned procedure may be triggered by the occurrence of a failure in an integral apparatus. Specifically speaking, if an integral apparatus monitors itself and a failure occurs in one device in its configuration, it reports the failure to the management computer 500, which may be a trigger for the above-mentioned procedure; or if the management computer 500 regularly monitors the integral apparatuses within its management range and determines that no response indicates a failure, which may be a trigger for the above-mentioned procedure.

The details of the integral apparatus and the computer system according to this invention will be explained below.

Figure 5A:
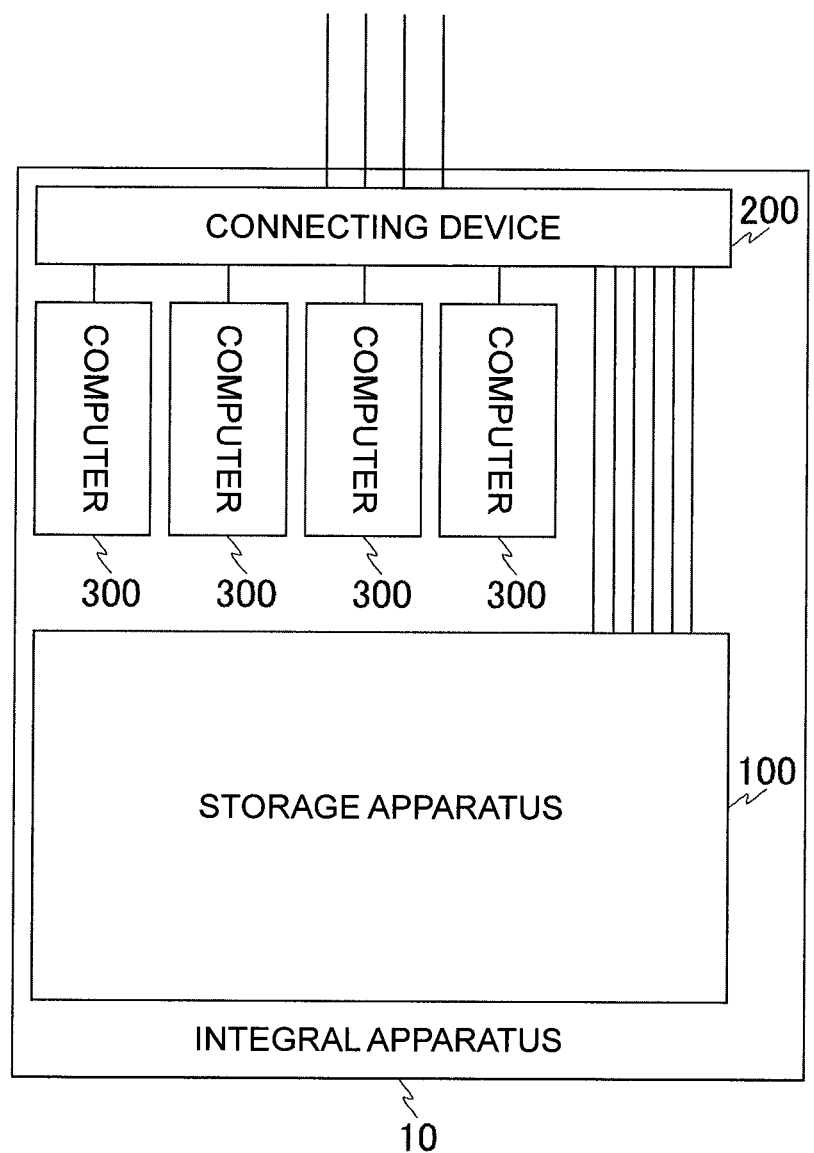
FIG. 5a is a block diagram showing the schematic configuration of an integral apparatus according to the first embodiment.

FIG. 5a shows a configuration example for the integral apparatus 10. The integral apparatus 10 shown in FIG. 5a includes four computers 300, one storage apparatus 100, and one connecting device 200. Each computer 300 and the connecting device 200 are connected by one cable. The storage apparatus 100 and the connecting device 200 are connected by six cables. The connecting device 200 can be connected to an external connecting device 50 via four cables. In this embodiment, a connecting device that conforms to Ethernet (registered trademark) standards is used as the connecting device 50; however, a connecting device that conforms to standards other than Ethernet (registered trademark) may also be used.

Figure 5B:
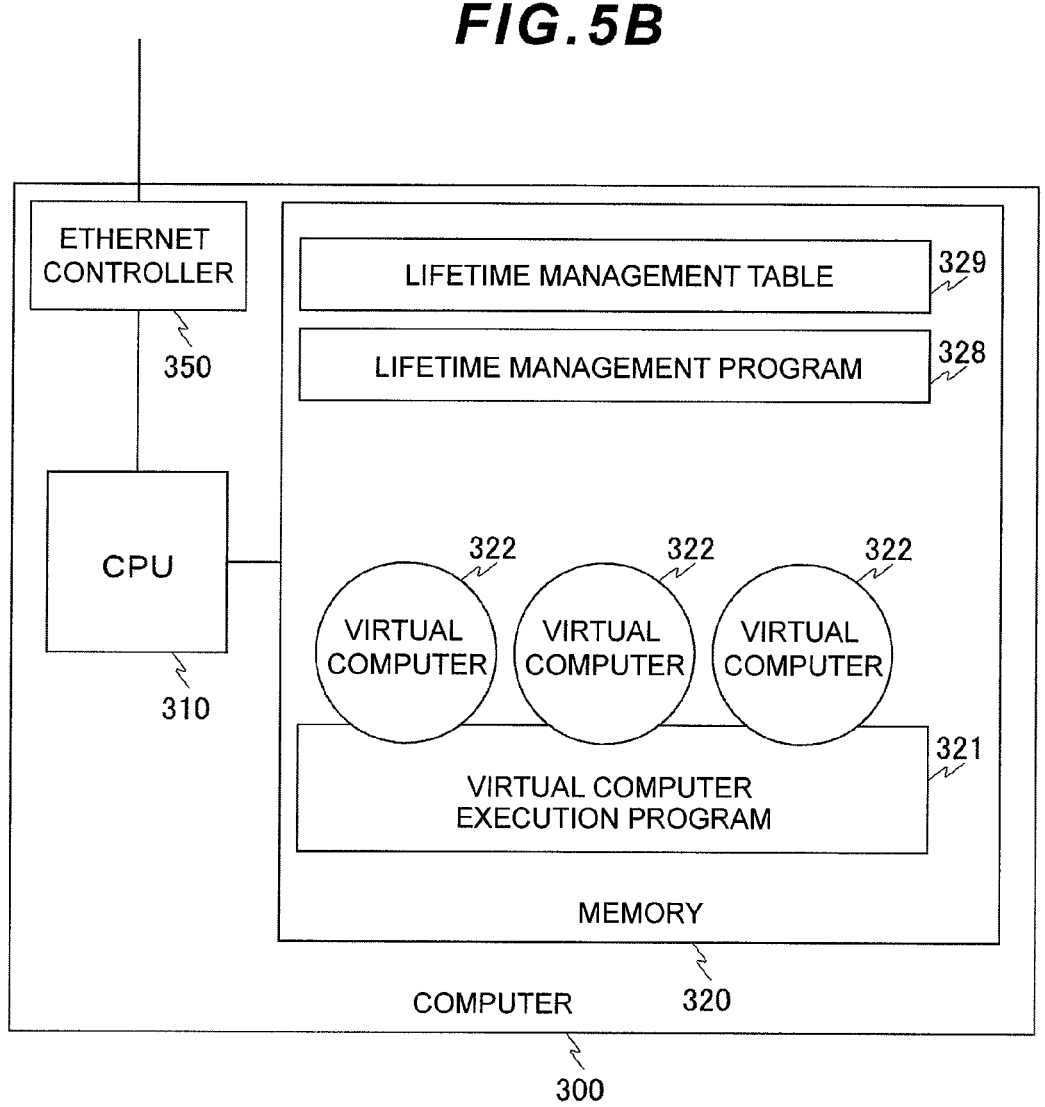
FIG. 5b is a block diagram showing the schematic configuration of a computer according to the first embodiment.

FIG. 5b shows the configuration of the computer 300. The computer 300 includes: a CPU 310 for executing programs, a memory 320 for storing programs and data used by the programs; and an Ethernet controller 350 for connection to the connecting device 200.

The memory 320 for the computer 300 stores a virtual computer execution program 321 for executing virtual computers, virtual computers 322, a lifetime management program 328 for managing introduction time and operating time of the computers, and a lifetime management table 329.

This embodiment will be explained about, for example, a case where a data processing process will be executed on the virtual computer 322. Also, in this embodiment, the data processing will be executed in one or more processes. The processes are managed on a normalized computer power basis by the management computer 500. The normalized computer power means the power of a computer that is normalized by considering the computer's throughput at a certain point in time as "1." For example, a process that requires "4" normalized computer power can be executed on a computer having 4 or more normalized computer power. The computer power of a virtual computer for executing the process can be changed by changing resources allocated to the virtual computer (for example, CPU resources (the number of cores)) or changing allocation time or the like.

Examples of method for improving the data processing performance are: a method of increasing the normalized computer power allocated to the processes; and a method of executing data processing concurrently in a plurality of processes. Which method could improved the data processing performance more depends on the types of data processing. The following cases are assumed in this embodiment: a case in which the performance is improved by dividing a process; and a case in which the performance is improved without dividing a process. Specifically speaking, the former example is a case where one page such as Web site is provided by a plurality of computers and the latter example is a case where a database cannot be divided.

If the management computer 500 detects a high load process, and if data processing for that process can be implemented by executing a plurality of processes concurrently, the number of processes is increased and the data processing is executed concurrently. So, virtual computers and storage areas are created so that the data processing can be executed concurrently. For example, if the load on process A that has been executed with the normalized computer power "1" increases, the management computer 500 creates a virtual computer(s) and a storage area(s) whose normalized computer power is "1"; and then executes process A on the created virtual computer(s).

If the management computer 500 detects a high load process and if data processing for the process cannot be implemented by executing a plurality of processes concurrently, the normalized computer power allocated to that process is increased. For example, if the load on process B which has been executed with the normalized computer power "4" increases, the management computer changes the normalized computer power, which is allocated to virtual computers executing process B, to "6." For example, if two virtual computers whose normalized computer power is "4" are executed on a computer with the normalized computer power "8," it is necessary to migrate one virtual computer to another computer 300 in order to change the normalized computer power of the above-mentioned virtual computers to "6."

Figure 5C:
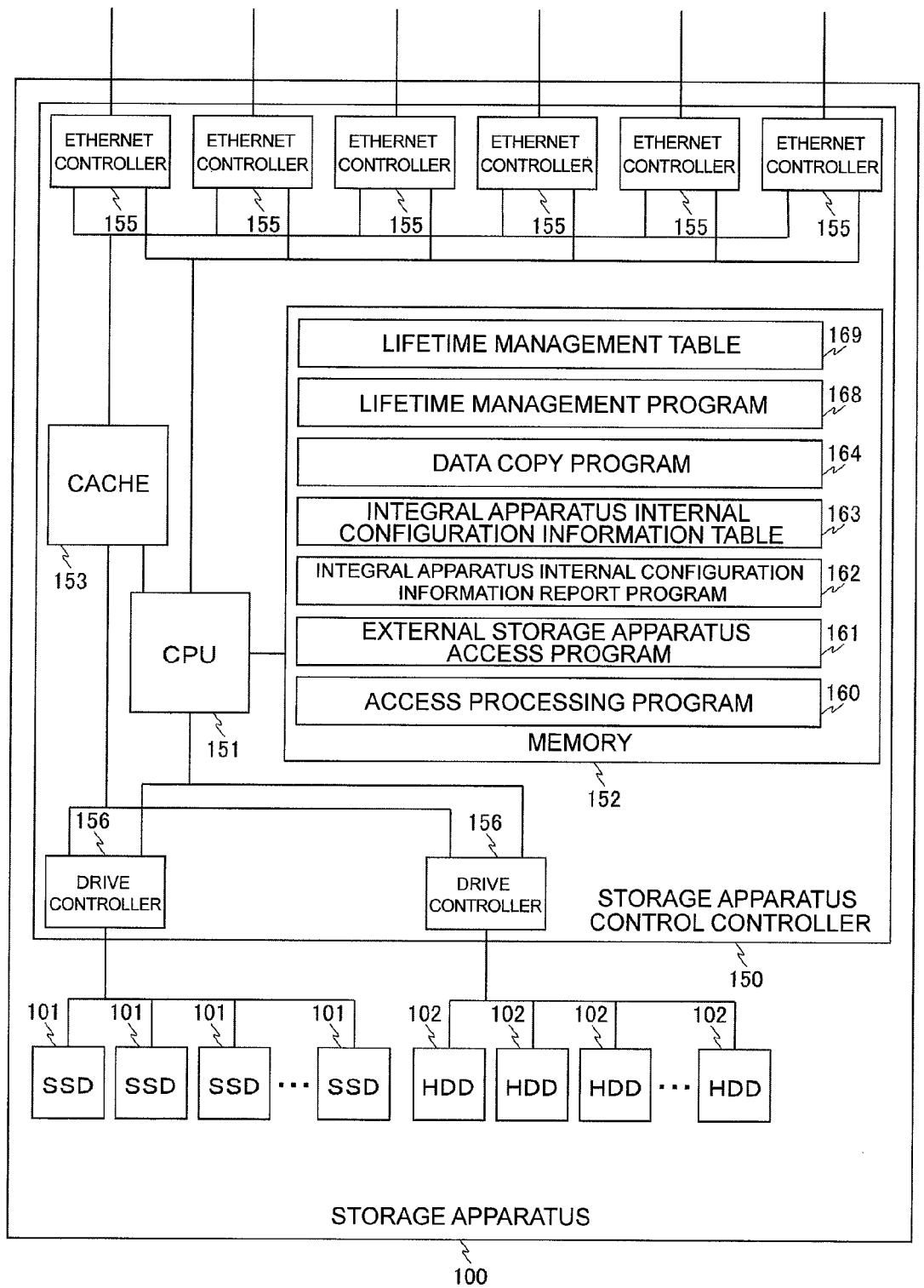
FIG. 5c is a block diagram showing the schematic configuration of a storage apparatus according to the first embodiment.

FIG. 5c shows the configuration of the storage apparatus 100. The storage apparatus 100 includes: a storage apparatus control controller 150 for controlling reading/writing of programs and data from/to the computer 300; and storage media such as SSDs (solid state drives) 101 and HDDs (Hard Disk Drives) 102 for storing programs and data. Incidentally, only either one of the SSDs 101 and the HDDs 102 may be used as the storage media.

The storage apparatus control controller 150 includes: a CPU 151 for executing programs, a memory 152 for storing programs and data used by the programs; a cache 153 for temporarily storing data written by the computer 300 or data read from the storage media (the SSDs 101 or the HDDs 102); an Ethernet controller 155 for connection with the connecting device 200; and a drive controller 156 for connection with the SSDs 101 and/or the HDDs 102.

The memory 152 for the storage apparatus control controller 150 stores: an access processing program 160 for executing a read/write request from the computer 300; an external storage apparatus access program 161 for issuing a read/write request to other storage apparatuses 100; an integral apparatus internal configuration information report program 162 for retaining a connection relationship between the apparatuses/devices in the integral apparatus 10; an integral apparatus internal configuration information table 163; a data copy program 164 for copying data between the storage apparatuses 100; a lifetime management program 168 for managing the introduction time and operating time of the storage apparatuses 100; and a lifetime management table 169.

Figure 5D:
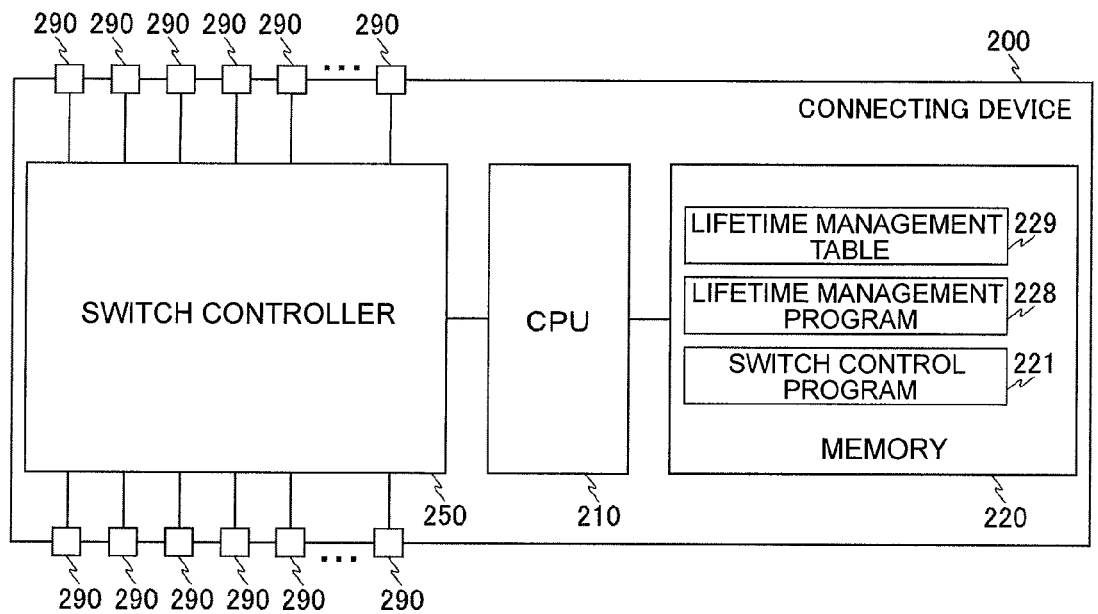
FIG. 5d is a block diagram showing the schematic configuration of a connecting device according to the first embodiment.

FIG. 5d shows the configuration of the connecting device 200. The connecting device 200 includes: a CPU 210 for executing programs; a memory 220 for storing programs and data used by the programs; a switch controller 250 for controlling communication exchanges; and connection ports 290 for connecting cables from the computers 300, the storage apparatuses 100, or other connecting devices 200.

The memory 220 for the connecting device 200 stores: a switch control program 221 for controlling communication exchanges; a lifetime management program 228 for managing introduction time and operating time of the connecting device 200; and a lifetime management table 229.

Figure 5E:
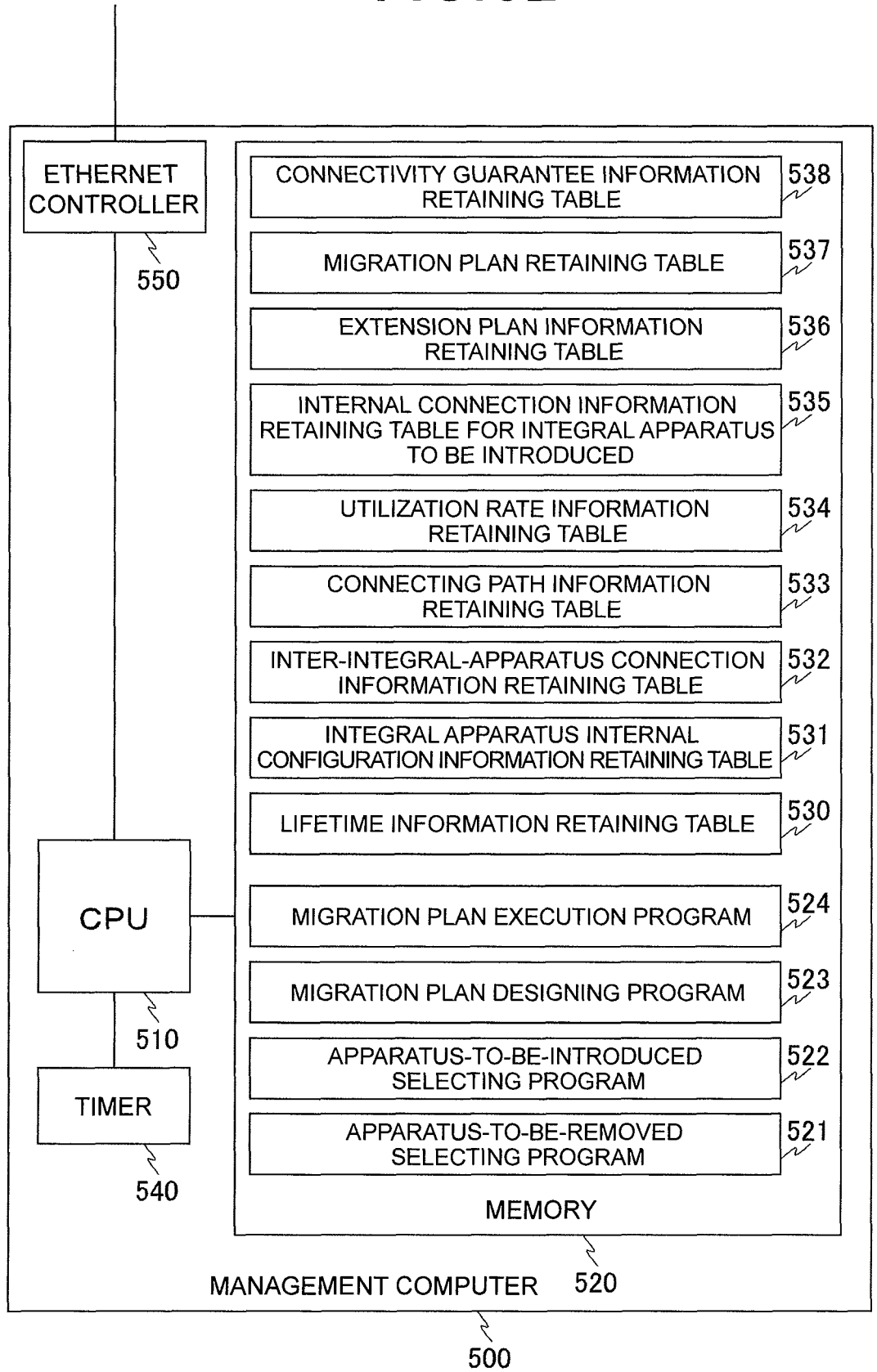
FIG. 5e is a block diagram showing the schematic configuration of a management computer according to the first embodiment.

FIG. 5e shows the configuration of the management computer 500. The management computer 500 includes: a CPU 510 for executing programs; a memory 520 for storing programs and data used by the programs; a timer 540 used to judge the lifetime of apparatuses/devices and create the utilization rate information 412 (FIG. 4c); and an Ethernet controller 550 for connection with the connecting device 200.

The memory 520 for the management computer 500 stores: a apparatus-to-be-removed selecting program 521; an apparatus-to-be-introduced selecting program 522; a migration plan designing program 523; a migration plan execution program 524; a lifetime information retaining table 530 for storing lifetime information collected from each apparatus/device; an integral apparatus internal configuration information retaining table 531 for storing the integral apparatus internal configuration information 404 (FIG. 4c) collected from each integral apparatus 10; an inter-integral-apparatus connection information retaining table 532 for storing the inter-integral apparatus connection information 411 (FIG. 4c) which is connection information between the integral apparatuses; a connecting path information retaining table 533 for storing the connecting path information 410 (FIG. 4c) from the virtual computers to the storage areas; a utilization rate information retaining table 534 for storing the utilization rate information 412 about each virtual computer and each storage area; an internal configuration information retaining table for an integral apparatus to be introduced 535 for storing the internal configuration information about an integral apparatus to be introduced 421 (FIG. 4c) obtained via, for example, the Internet; an extension plan information retaining table 536 for storing the extension plan information 430 (FIG. 4c) which is input by the system administrator; a migration plan retaining table 537 for storing the migration plan 432 (FIG. 4d) designed by the migration plan execution program 524; and a connectivity guarantee information retaining table 538 for storing the connectivity guarantee information 420 (FIG. 4c) obtained via, for example, the Internet.

Figure 6A:
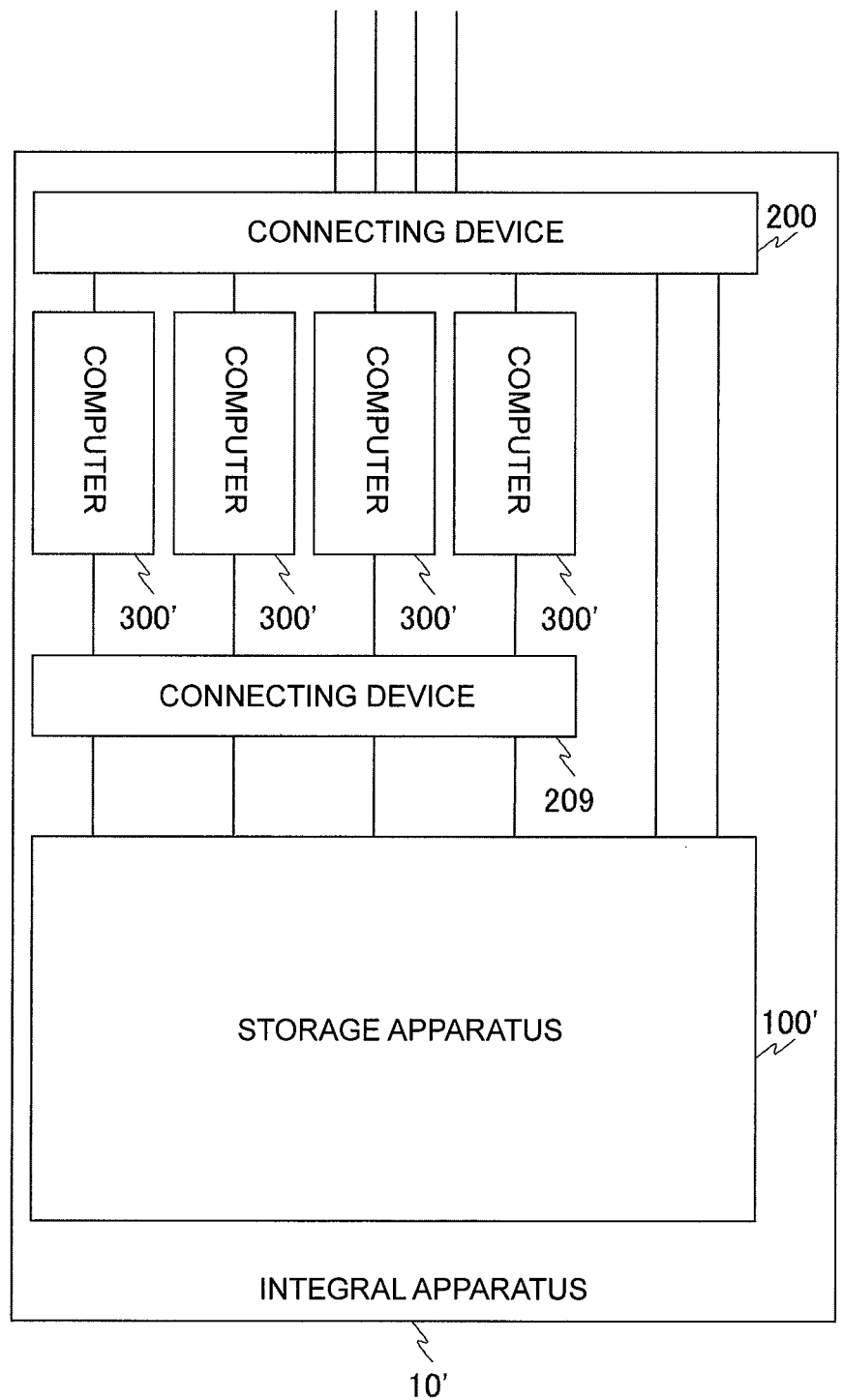
FIG. 6a is a block diagram showing another configuration example for the integral apparatus.

FIG. 6a shows another configuration example for the integral apparatus 10' described earlier with reference to FIG. 3. This integral apparatus 10' includes four computers 300', one storage apparatus 100', and two connecting devices 200, 209. The computer 300' and the connecting device 200 are connected via one cable using the Ethernet. The computers 300' and the connecting device 209 are connected via four cables using Fibre Channel. The storage apparatus 100' and the connecting device 209 are connected via four cables using Fibre Channel. Furthermore, the storage apparatus 100' and the connecting device 200 are connected via two cables using the Ethernet. The connections can be implemented even if any means other than the Ethernet or Fibre Channel is used as the connecting devices 200, 209. For example, PCI-express or the like may be used instead of Fibre Channel as the connecting device 209.

Figure 6B:
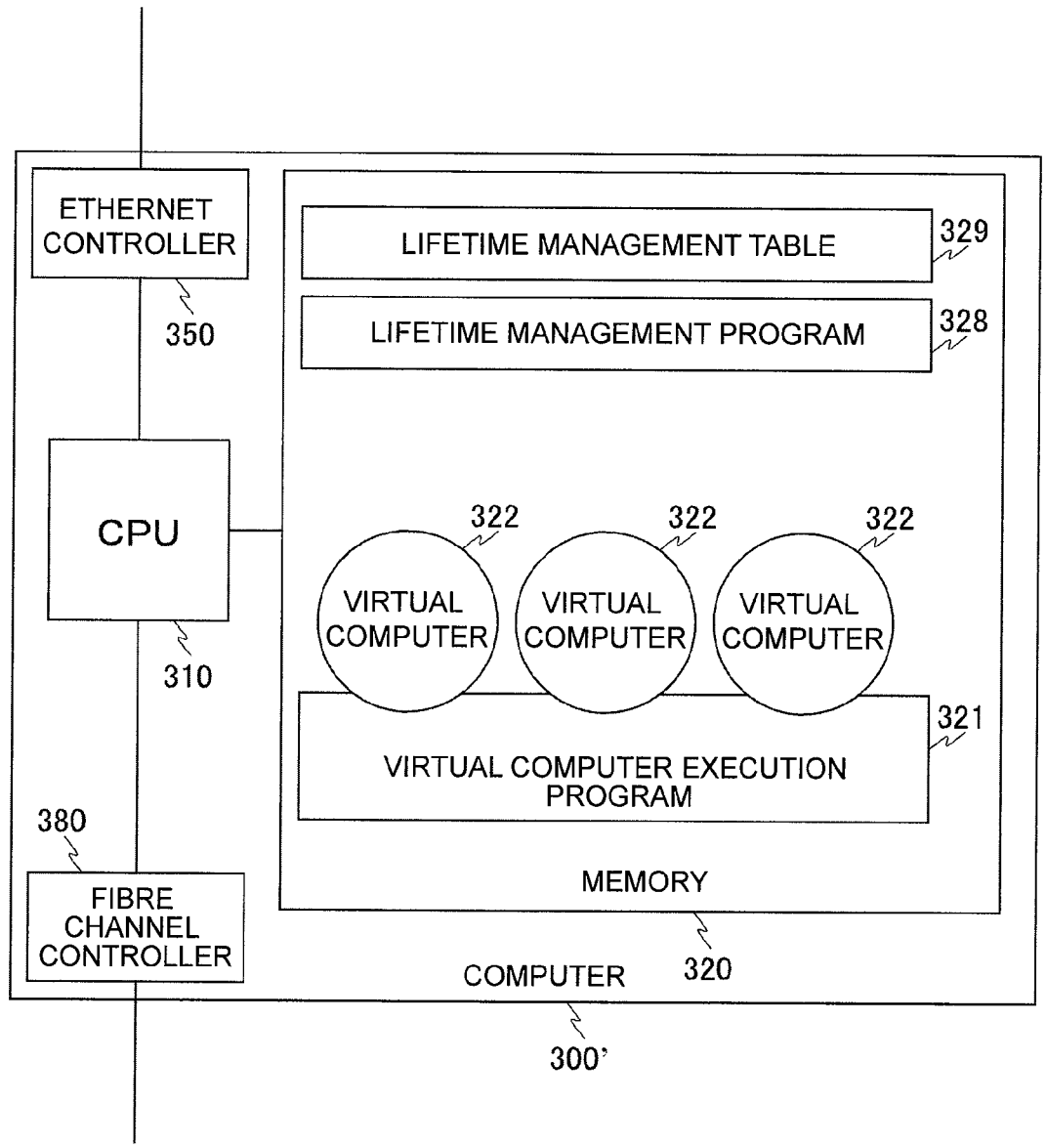
FIG. 6b is a block diagram showing another configuration example for the computer.

FIG. 6b shows the configuration of the computer 300'. The computer 300' is configured by including a Fibre Channel controller 380 for connecting to the connecting device 209, in addition to the configuration of the computer 300.

Figure 6C:
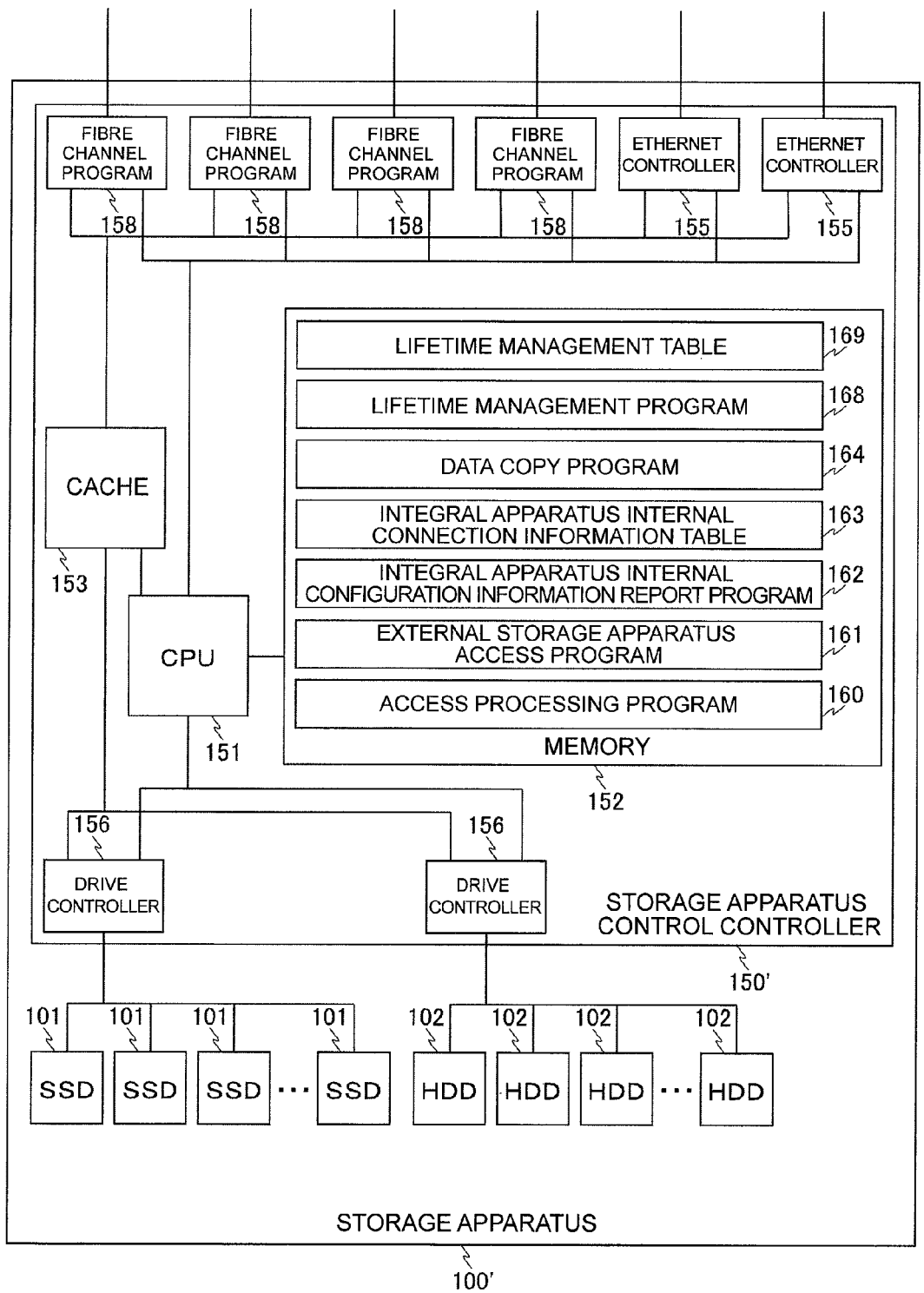
FIG. 6c is a block diagram showing another configuration example for the storage apparatus.

FIG. 6c shows the configuration of the storage apparatus 100'. With the storage apparatus control controller 150', two out of six network controllers for the storage apparatus control controller 150 are Ethernet controllers 155 and the other four network controllers are Fibre Channel controllers 158 for connecting to the connecting device 209.

Figure 7A:
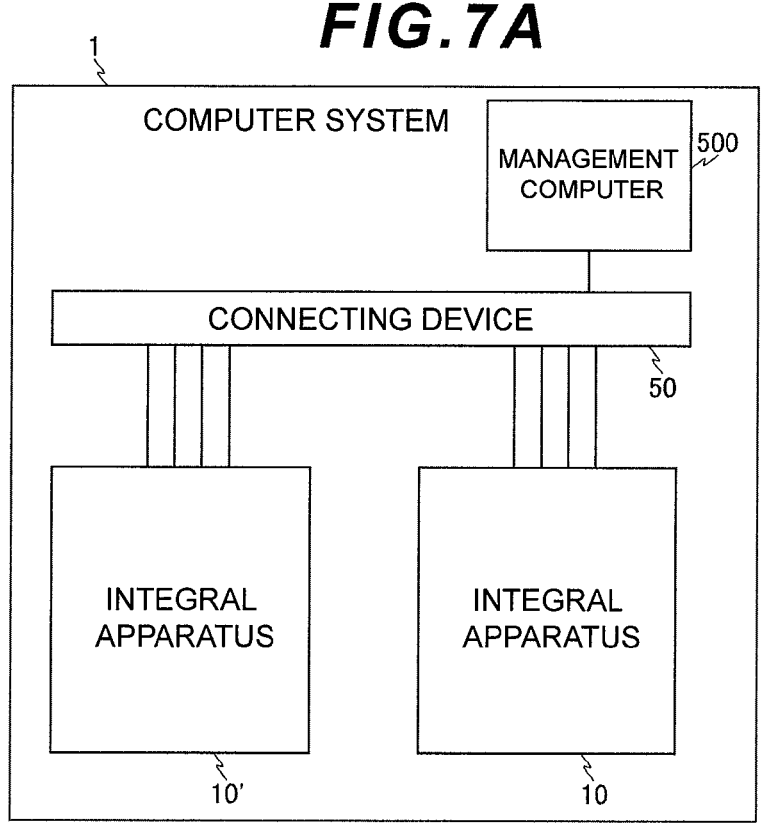
FIG. 7a is a block diagram showing a configuration example for a computer system using integral apparatuses.

FIG. 7a shows a configuration example for a computer system using the integral apparatuses 10, 10'. This computer system includes one integral apparatus 10 and one integral apparatus 10'. The two integral apparatuses 10, 10' are connected via the connecting device 50. Since both the connecting device 200 in the integral apparatus 10 and the connecting device 200 in the integral apparatus 10' are compatible with the Ethernet, the connecting device 50 which is compatible with the Ethernet is also used. The management computer 500 is also connected to the connecting device 50.

Figure 7B:
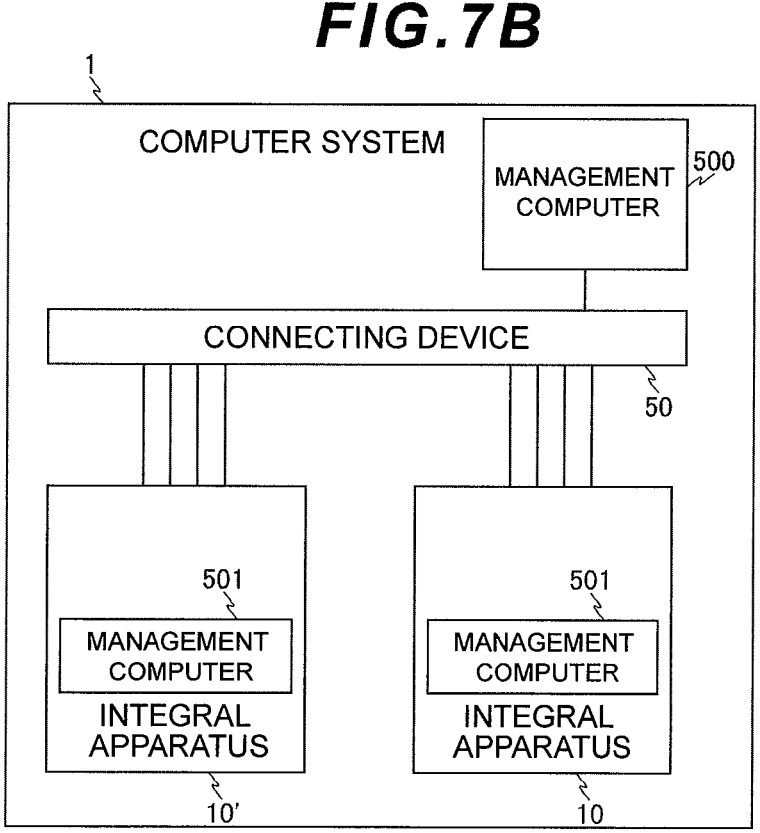
FIG. 7b is a block diagram showing a configuration example for a computer system using integral apparatuses.

FIG. 7b shows an example of a computer system in which part of the functions of the management computer 500 is executed by the integral apparatuses 10, 10', in addition to FIG. 7a.

FIG. 8 shows a configuration example of the lifetime management tables 329, 169, 229 shown in FIG. 5b to FIG. 5d, FIG. 6a, and FIG. 6b. Each of the computers 300, 300', the storage apparatuses 100, 100', and the connecting device 200 according to this embodiment retains the lifetime information. The lifetime information includes an operation start date and time, actual operating time, specified apparatus lifetime, and specified operating time. When a period of the specified apparatus lifetime has elapsed since the operation start date and time, or if the specified operating time has elapsed as the actual operating time, it is determined that the relevant apparatus/device has reached the end of its lifetime, and the apparatus/device becomes a candidate to be removed.

In this embodiment, it is assumed that the operation start dates and times and the actual operating time of devices/apparatuses in an integral apparatus become identical to each other. This is because basically power on/off processing is not executed individually in the computers 300, 300', the storage apparatuses 100, 100', and the connecting device 200, so that the operation start dates and times and the actual operating time of the devices/apparatuses in an integral apparatus become identical to each other. However, if a faulty apparatus/device is replaced, this will result in the existence of an apparatus/device whose operation start date and time and actual operating time are different from those of the other apparatuses/devices. In this case, if there are a larger number of apparatuses/devices which have reached the end of their lives (this situation can be seen in most cases) according to a ratio of the apparatuses/devices which have reached the end of their lives, to apparatuses/devices which have not reached the end of their lives, the lifetime of the integral apparatus as a whole is judged from a majority of the apparatuses/devices in the integral apparatus, that is, the apparatuses/devices which have reached the end of their lives. The apparatus-to-be-removed selecting program 521 for the management computer 500 regularly collects the lifetime information from each apparatus/device and stores it in the lifetime information retaining table 530 (FIG. 5*e*).

Incidentally, an information retaining form is expressed as a table, but any retaining form such as a list may be used as long as the content is substantially the same. The same can be said for information hereinafter described.

In this embodiment as described above, each of the computers 300, 300', the storage apparatuses 100, 100', and the connecting device 200 has the lifetime management program 328, 168, 228 (FIG. 5*a* to FIG. 5*d*, FIG. 6*b*, and FIG. 6*c*) and the lifetime management table 329, 169, 229 (FIG. 5*a* to FIG. 5*d*, FIG. 6*b*, and FIG. 6*c*). The form in which the management computer 500 collects the lifetime information from each apparatus/device will be explained below. However, a form in which some of the computers 300, 300' for the integral apparatus 10, 10' collects the lifetime information in the integral apparatus 10, 10' and then notifies the management computer 500 of the collected information may also be used.

In this case, the lifetime collecting program 328 (FIG. 5*b*) is executed on the computers 300, 300' for the integral apparatus 10, 10' and then the apparatus-to-be-removed selecting program 521 (FIG. 5*e*) for the management computer 500 collects all the pieces of the lifetime information about the integral apparatus 10, 10' together from the lifetime collecting program 328. Also, as shown in FIG. 7*b*, a dedicated management computer 501 for the integral apparatus 10, 10' may be provided within the integral apparatus 10, 10'. In this case, the lifetime information collecting program is executed on the management computer 501 for the integral apparatus 10, 10' and the apparatus-to-be-removed selecting program 521 for the management computer 500 collects all the pieces of lifetime information about the integral apparatus together from the lifetime information collecting program 328.

Figure 9B:
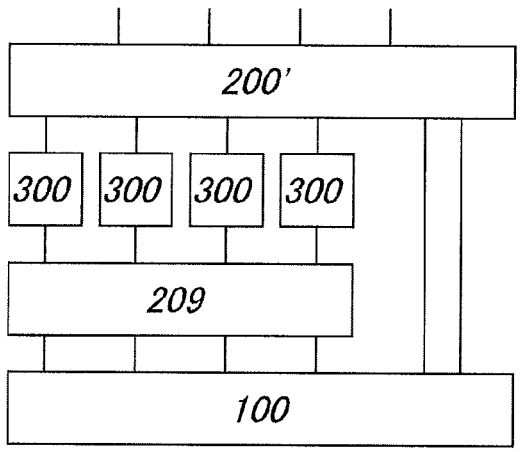
FIG. 9b is a conceptual diagram showing a configuration example for integral apparatus internal configuration information.

FIG. 9*a* and FIG. 9*b* show configuration examples for internal configuration information about the integral apparatus 10, 10'. FIG. 9*a* corresponds to the integral apparatus 10 and FIG. 9*b* corresponds to the integral apparatus 10'. The integral apparatus 10, 10' has the integral apparatus internal configuration information 404 (FIG. 4*c*) which retains a connection relationship between apparatuses/devices in the integral apparatus 10, 10'. In this embodiment, the integral apparatus internal configuration information table 163 (FIG. 5*c*, FIG. 6*c*) and the integral apparatus internal configuration information report program 162 (FIG. 5*c*, FIG. 6*c*) are located in the storage apparatus 100, 100'. The integral apparatus internal configuration information table 163 and the integral apparatus internal configuration information report program 162 may be located in the computer 300, 300' or in the connecting device 200. Furthermore, the management computer 501 may be provided in the integral apparatus 10, 10' as shown in FIG. 7*b* and the management computer 501 may have the integral apparatus internal configuration information table 163 and the integral apparatus internal configuration information report program 162.

The integral apparatus internal configuration information 404 contains information such as topology information about the types and connection forms of the connecting device 200, the computers 300, 300', and the storage apparatuses 100, 100' which constitute the integral apparatus 10, 10'; the type of the connecting device 200, the number of mounted components in the connecting device 200, and the number of connections of the connecting device 200 with external connecting devices; the normalized computer power of the computers 300, 300'; and the storage capacity of the storage apparatus(es) 100, 100'.

Regarding processing power of the computers 300, 300', the total throughput of all the computers 300, 300' belonging to the integral apparatus 10, 10' (the total throughput of the four computers 300, 300' in FIG. 9*a* and FIG. 9*b*) is managed as the normalized computer power. So, computer power size differences between the integral apparatuses 10, 10' can be found by, for example, comparing the total normalized computer power of the computers 300, 300' in an integral apparatus 10, 10' with that of another integral apparatus 10, 10'.

Furthermore, regarding the storage capacity of the storage apparatus 100, 100', a total storage capacity of all the storage apparatuses 100, 100' included in the integral apparatus 10, 10' is managed. So, storage capacity size differences between the integral apparatuses 10, 10' can be compared by, for example, comparing the storage capacity of a storage apparatus 100, 100' in the integral apparatus internal configuration information 404 about a certain integral apparatus 10, 10' with the storage capacity of another integral apparatus 10, 10'.

Accordingly, the resource status between the integral apparatuses 10, 10' can be easily compared by using the integral apparatus internal configuration information 404. So, when considering addition or removal of an integral apparatus 10, 10' as a unit to or from the computer system as described in this embodiment, calculation of a resource increase/decrease will be facilitated. In other words, the integral apparatus 10, 10' can be considered to be a unit managed by either the total amount of normalized computer power or the total amount of resources in the integral apparatus 10, 10', or both of them, as shown in the integral apparatus internal configuration information 404 about the integral apparatus 10, 10'.

The migration plan designing program 522 (FIG. 5*e*) and the apparatus-to-be-introduced selecting program 523 (FIG. 5*e*) for the management computer 500 collect the integral apparatus internal configuration information 404 from the storage apparatuses 100, 100' in each integral apparatus 10, 10' and stores it in the integral apparatus internal configuration information retaining table 531 (FIG. 5*e*).

Figure 10:
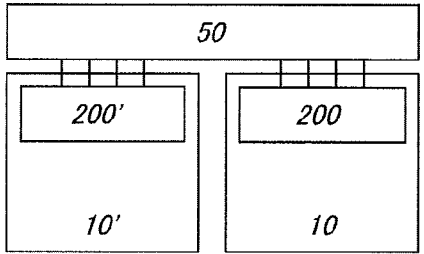
FIG. 10 is a conceptual diagram showing a configuration example for inter-integral-apparatus connection information.

FIG. 10 shows an example of connection information between the integral apparatuses 10, 10'. The migration plan designing program 522 for the management computer 500 always monitors an addition of a new integral apparatus 10, 10' to the computer system. If the migration plan designing program 524 detects that a new integral apparatus 10, 10' is connected to the computer system, it obtains the integral apparatus internal configuration information 404 from all the integral apparatuses 10, 10', including the newly added integral apparatus, and updates the inter-integral-apparatus connection information 411 (FIG. 4c) retained by the management computer 500. FIG. 10 shows that the connecting device 50 is connected to two integral apparatuses 10, 10' and the number of connections with each integral apparatus 10, 10' is four.

FIG. 11 shows a configuration example for the connecting path information 410 (see FIG. 4c). The management computer 500 retains the connecting path information 410, which shows the relationship between virtual computers 322 (FIG. 5b, FIG. 6b) executed on the computers 300, 300' for the integral apparatus 10, 10' and storage areas used by the virtual computers 322, in the connecting path information retaining table 533 (see FIG. 5e). Since a unique identification number is assigned to each of the virtual computers 322 and the storage areas according to this embodiment, each virtual computer 322 or each storage area can be uniquely identified. For example, FIG. 11 shows that a virtual computer 322 numbered "30001" is being executed on a computer 300 numbered "300a" and is using a storage area numbered "10001" in a storage apparatus 100 numbered "100." FIG. 11 also shows that, for example, a virtual computer 322 numbered "31007" is being executed on a computer 300' numbered "300'c" and is using a storage area numbered "10007" in the storage apparatus 100 numbered "100." A latency policy can be added to the connecting path information 410.

Regarding the connecting path information 410 shown in FIG. 11, a latency policy for each of a virtual computer 322 numbered "30009" and a virtual computer 322 numbered "31009" is designated as "within the integral apparatus." If the latency policy is designated as "within the integral apparatus," a storage area to be used by the relevant virtual computer 322 needs to be prepared in the storage apparatus 100, 100' for the same integral apparatus 10, 10' as the integral apparatus 10, 10' where the computer 300, 300' on which the relevant virtual computer 322 is to be executed exists. If the virtual computer 322 and the storage area are provided in the same integral apparatus 10, 10', the virtual computer 322 can access the storage area without the intermediary of the connecting device 50, thereby preventing growth of latency and improving the performance. Therefore, the latency policy "within the integral apparatus" is designated for the virtual computer 322 which executes a process requiring response performance. The latency policy can be designated from the management computer 500.

Furthermore, the latency policy may be based on whether the virtual computer 322 and the storage area exist close to each other or not. The expression "close" herein used possibly means, for example, a physical configuration indicating how many devices exist from the computer 300, 300' or the storage apparatus 100, 100', on which the virtual computer 322 or the storage area serving as the basis operates, to another virtual computer 322 or storage apparatus 100, 100', or a management unit (management range) of the management computer 500.

FIG. 12 shows a configuration example for the utilization rate information 412 (see FIG. 4c). The management computer 500 regularly obtains a load on the virtual computers 322 and the storage areas and stores and retains the course of load acquisition on the basis of data processing in the utilization rate information retaining table 534 (FIG. 5e). Also, the management computer 500 regularly obtains the used capacity of the storage areas and stores and retains the course of used capacity acquisition in the utilization rate information retaining table 534.

For example, FIG. 12 shows that data processing numbered "90000" is being executed by process numbered "90001" on a virtual computer 322 numbered "30009." FIG. 12 also shows that the management computer 500 obtains CPU load factors of the virtual computers 322 and the used capacities of the storage areas every minute. Incidentally, if the CPU load factor increases, the management computer 500 increases the normalized computer power allocated to the virtual computer 322 numbered "30009," thereby improving the data processing performance.

FIG. 12 also shows that data processing numbered "91000" is being executed by a process numbered "91001" on a virtual computer 322 numbered "30001." FIG. 12 also shows that the management computer 500 obtains a CPU load factor of a virtual computer 322 numbered "30001" and a utilization rate of a storage area numbered "10001" every minute. If the CPU load factor increases, the management computer 500 creates a new virtual computer 322 numbered "30002" and a new storage area numbered "10002," activates a process numbered "91002" on the virtual computer 322 numbered "30002," and executes the data processing sequences concurrently, thereby improving data processing performance.

Since an improvement rate of the normalized computer power and an improvement rate of the storage capacity can be recognized for each data processing sequence by using the utilization rate information 412, it is possible to recognize the total normalized computer power and the total storage capacity of the storage areas which will be required in the future.

FIG. 13a to FIG. 13e show configuration examples for the internal configuration information about an integral apparatus to be introduced 421 (see FIG. 4c). The management computer 500 obtains the internal configuration information about an integral apparatus to be introduced 421 through, for example, the Internet. The internal configuration information about an integral apparatus to be introduced 421 is the integral apparatus connection information (FIG. 4c) about an integral apparatus that can be supplied by a vendor. As a result, the apparatus-to-be-introduced selecting program 522 for the management computer 500 (FIG. 5e) selects an integral apparatus to be introduced next based on this internal configuration information about an integral apparatus to be introduced 421.

Figure 13A:
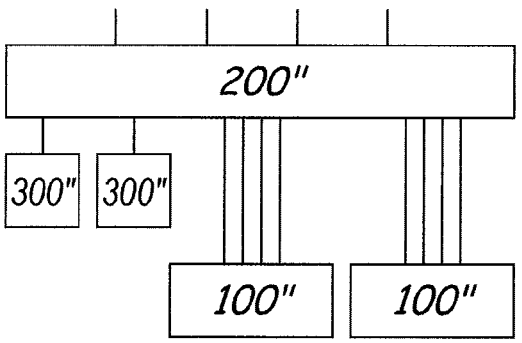
FIG. 13a is a conceptual diagram showing a configuration example for internal configuration information about an integral apparatus to be introduced.
Figure 13B:
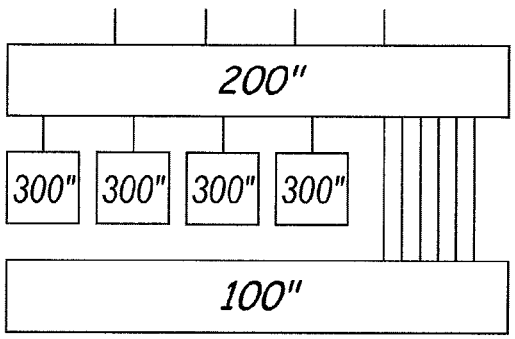
FIG. 13b is a conceptual diagram showing a configuration example for the internal configuration information about an integral apparatus to be introduced.

FIG. 13a shows a configuration example for the internal configuration information about an integral apparatus to be introduced 421 with regard to the integral apparatus 11 described with reference to FIG. 1. This example shows that the integral apparatus 11 is constituted from two computers 300 and two storage apparatuses 100 and the total storage capacity of the storage apparatuses 100 is 200 TB. FIG. 13b shows a configuration example for the internal configuration information about an integral apparatus to be introduced 421 with regard to the integral apparatus 12 described with reference to FIG. 1. This example shows that the integral apparatus 12 is constituted from four computers 300 and one storage apparatus 100 and the storage capacity of the storage apparatus 100 is 100 TB.

Figure 13D:
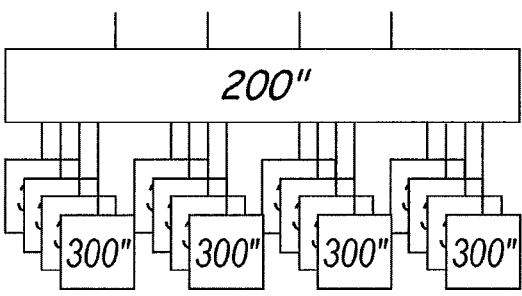
FIG. 13d is a conceptual diagram showing a configuration example for the internal configuration information about an integral apparatus to be introduced.

FIG. 13c is a configuration example for the internal configuration information about an integral apparatus to be introduced 421 with regard to the integral apparatus 13 described with reference to FIG. 1. This example shows that the integral apparatus 13 is constituted from eight computers 300 and one storage apparatus 100 and the storage capacity of the storage apparatus 100 is 10 TB. FIG. 13d is a configuration example for the internal configuration information about an integral apparatus to be introduced 421 with regard to the integral apparatus 14 described with reference to FIG. 1. This example shows that the integral apparatus 14 is constituted from sixteen computers 300. Since the integral apparatus 14 does not have a storage apparatus 100, it has no storage capacity.

Furthermore, FIG. 13e is a configuration example for the internal configuration information about an integral apparatus to be introduced 421 with regard to the integral apparatus 15 described with reference to FIG. 1. This example shows that the integral apparatus 15 is constituted from only one storage apparatus 100 and the storage capacity of the storage apparatus 100 is 400 TB. As described above, the integral apparatus 15 is not an integral apparatus in a strict sense; however, since the integral apparatus 15 is treated in the same manner as other integral apparatuses 11 to 14, it is treated as an integral apparatus.

The apparatus-to-be-introduced selecting program 523 for the management computer 500 (FIG. 5e) collects the internal configuration information about an integral apparatus to be introduced 421 via, for example, the Internet and stores and retains it in the internal configuration information retaining table for an integral apparatus to be introduced 535 (FIG. 5e). Incidentally, the type of a vendor and information to be provided about costs (not shown in the drawing) may be included in the internal configuration information about an integral apparatus to be introduced 421.

FIG. 14 shows a configuration example for the extension plan information 430 (see FIG. 4c). The system administrator can input the extension plan information 430 by using an input means of the management computer 500. The extension plan information 430 is information indicating a plan to introduce a new integral apparatus and locate new virtual computers 322 and storage areas. FIG. 14 shows that new "50" combinations of virtual computers 322 and storage areas, whose normalized computer power is "4," storage capacity is "1 TB," and latency policy is "none," and new "8" combinations of virtual computers 322 and storage areas, whose normalized computer power is "16," storage capacity is "2 TB," and latency policy is "within the integral apparatus," are required. The apparatus-to-be-introduced selecting program 522 for the management computer 500 (FIG. 5e) stores and retains the extension plan information 430, which has been input by the system administrator, in the extension plan information retaining table 536 (FIG. 5e).

Figure 15:
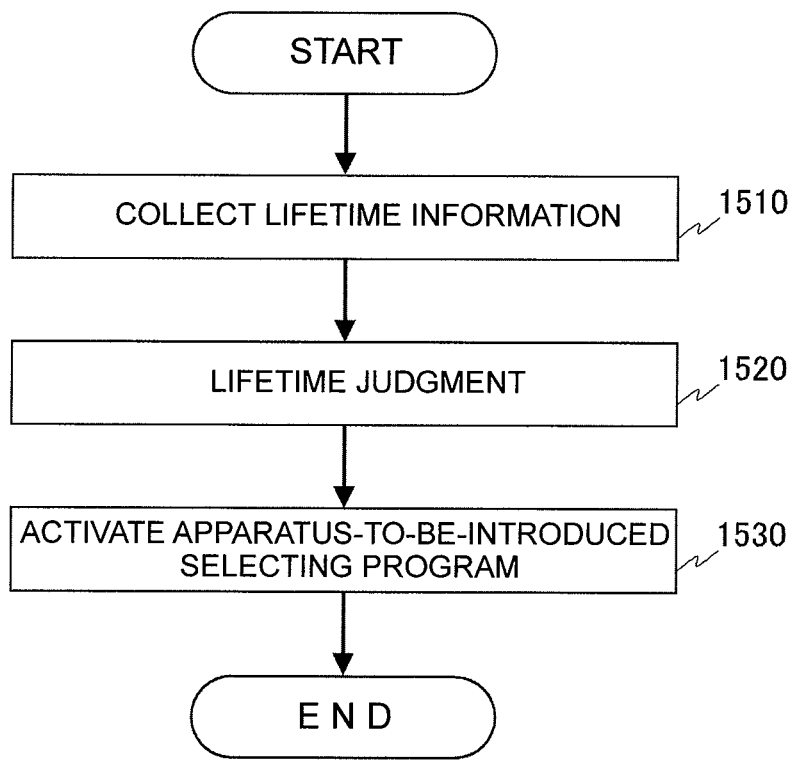
FIG. 15 is a flowchart illustrating a processing sequence for apparatus-to-be-removed selecting processing.

FIG. 15 shows a processing sequence for apparatus-to-be-removed selecting processing executed by the apparatus-to-be-removed selecting program 521.

The apparatus-to-be-removed selecting program 521 collects the lifetime information 401 (FIG. 4a) from all the computers 300, 300', the storage apparatuses 100, 100', and the connecting device 200 (step 1510) and performs lifetime judgment for each integral apparatus (step 1520).

Specifically speaking, if a large number of apparatuses/devices whose operating time exceeds their specified apparatus lifetime or specified operating time exist in an integral apparatus (for example, 80% or more of the apparatuses/devices in the relevant integral apparatus), it is decided by the lifetime judgment that the relevant integral apparatus has reached the end of its lifetime and is a candidate to be removed. For example, if the lifetime information collected from each apparatus/device in the integral apparatus 10' is as shown in FIG. 8, the actual operating time exceeds the specified operating time. Therefore, the integral apparatus 10' is a candidate to be removed from the computer system 1 show in FIG. 7a and FIG. 7b. Whether or not the specified apparatus lifetime has passed since the operation start date and time may be checked by comparing the specified apparatus lifetime with the length of time that has elapsed since the operation start date and time until the current date and time indicated by the timer 540 (FIG. 5e) provided in the management computer 500. However, if the operating time of any one of the apparatuses/devices (the connecting device 200 in particular) in the integral apparatus exceeds the specified apparatus lifetime or the specified operating time, the relevant integral apparatus may be considered to have reached the end of its lifetime and to be a candidate to be removed.

Next, after deciding the integral apparatus to be a candidate to be removed (hereinafter referred to as the "integral apparatus 10'") by the lifetime judgment in step 1520, the apparatus-to-be-removed selecting program 521 activates the apparatus-to-be-introduced selecting program 522 (step 1530); and then terminates this apparatus-to-be-removed selecting processing.

Figure 16:
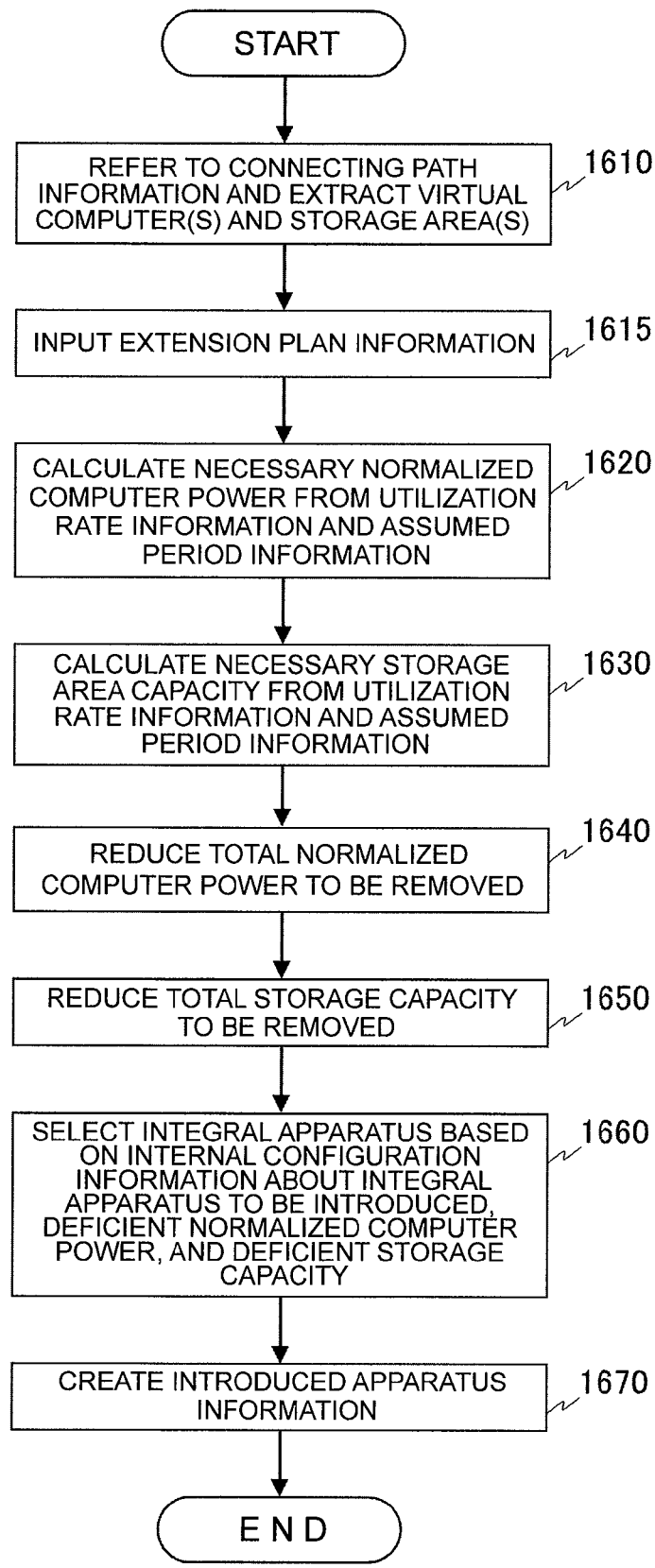
FIG. 16 is a flowchart illustrating a processing sequence for apparatus-to-be-introduced selecting processing.

FIG. 16 shows a processing sequence for apparatus-to-be-introduced selecting processing executed by the apparatus-to-be-introduced selecting program 522 activated in step 1530 in the apparatus-to-be-removed selecting processing.

The apparatus-to-be-introduced selecting program 522 firstly refers to the connecting path information 410 (FIG. 4c) retained in the connecting path information retaining table 533 (FIG. 5e) and extracts a virtual computer(s) 322 and a storage area(s) included in the integral apparatus 10' to be removed (step 1610).

Next, the apparatus-to-be-introduced selecting program 522 obtains assumed period information (step 1615). The assumed period information may be input by the system administrator by using the input means of the management computer 500 or may be set to the management computer 500 in advance. The assumed period information is a time interval at which the computer system 1 should be reviewed regularly; and, for example, a period of time such as six months, one year, 4380 hours, or 8760 hours is applied as the assumed period information.

Subsequently, the apparatus-to-be-introduced selecting program 522 refers to the utilization rate information 412 (FIG. 4c) stored in the utilization rate information retaining table 534 (FIG. 5e) and the assumed period information and calculates the normalized computer power that will be required for the whole computer system 1 within the assumed period (step 1620). The normalized computer power which will be required within the assumed period is calculated as the sum of the normalized computer power for individual data processing processes that are obtained by the following formula where $IR_P$ represents an improvement rate of the normalized computer power for a data processing process, T represents the assumed period, and CP represents the current normalized computer power for the relevant data processing process:

(Math. 1)

$$IR_P \times T + CP \qquad (1)$$

Then, the apparatus-to-be-introduced selecting program 522 refers to the utilization rate information 412 (FIG. 4c) stored in the utilization rate information retaining table 534 (FIG. 5e) and the assumed period information and calculates the storage area capacity that will be required for the whole computer system 1 within the assumed period (step 1630). The storage area capacity which will be required within the assumed period is calculated as the sum of the storage area capacities for individual storage areas that are obtained by the following formula where $IR_C$ represents an improvement rate of the storage capacity of a storage area, T represents the assumed period, and CC represents the current storage capacity of the relevant storage area:

(Math. 2)

$$IR_C \times T + CC \quad (2)$$

Next, the apparatus-to-be-introduced selecting program 522 subtracts the total normalized computer power of the integral apparatus to be removed from the total normalized computer power for the computer system which will be required within the assumed period as obtained in step 1620 (step 1640).

Furthermore, the apparatus-to-be-introduced selecting program 522 subtracts the total storage capacity of the integral apparatus to be removed from the storage area capacity of the computer system 1 which will be required within the assumed period as obtained in step 1630 (step 1650).

Subsequently, the apparatus-to-be-introduced selecting program 522 selects an integral apparatus to be introduced based on the internal configuration information about an integral apparatus to be introduced 421 (FIG. 4c) stored in the internal configuration information retaining table for an integral apparatus to be introduced 535 (FIG. 5e) as well as the normalized computer power and the storage capacity which will become deficient due to the removal of the integral apparatus (step 1660).

Next, the apparatus-to-be-introduced selecting program 522 creates the introduced apparatus information 431 (FIG. 4c) and presents the created introduced apparatus information 431 to the system administrator by means of an output means of the management computer 500 (step 1670).

Regarding the processing shown in FIG. 16, a latency policy may be considered in selecting the integral apparatus to be introduced in step 1660. If the latency policy "within the integral apparatus" is designated, the storage area to be used by the virtual computer 322 is to be located in the storage apparatus 100, 100' of the same integral apparatus as the integral apparatus where the computer 300, 300' on which the virtual computer 322 is executed exists. Therefore, even if other integral apparatuses have an extra storage capacity, if there is no available normalized computer power, it is necessary to prepare a new storage capacity. The apparatus-to-be-introduced selecting program 522 calculates the storage capacity in consideration of the above situation.

Furthermore, the extension plan information 430 (FIG. 4c) may be used by adding the next step when selecting the integral apparatus to be introduced. Specifically speaking, input of the extension plan information 430 by using the output means of the management computer 500 is requested as step 1615. The system administrator inputs the extension plan information 430. The input extension plan information 430 is stored and managed in the extension plan information retaining table 536 (FIG. 5e).

In this case, the processing in step 1620 and step 1630 will be changed respectively as described below. Consequently, a virtual computer(s) and storage capacity to be newly added will be considered in addition to the improvement rate calculated from the utilization rate information when selecting the integral apparatus to be introduced.

Specifically speaking, in step 1620, the apparatus-to-be-introduced selecting program 522 refers to the utilization rate information 412 stored in the utilization rate information retaining table 534 (FIG. 5e), the assumed period information, and the extension plan information 430 and calculates the normalized computer power for the whole computer system 1 which will be required within the assumed period. The normalized computer power which will be required within the assumed period can be obtained by calculating the sum of all the data processing processes by adding the normalized computer power for an extended part of the relevant data processing process recognized by the extension plan information 430 to the normalized computer power calculated according to the formula (1) mentioned above for each individual data processing process.

In step 1630, the apparatus-to-be-introduced selecting program 522 refers to the utilization rate information 412 stored in the utilization rate information retaining table 534, the assumed period information, and the extension plan information 430 and calculates the storage area capacity of the whole computer system 1 which will be required within the assumed period. The storage area capacity which will be required within the assumed period can be obtained by calculating the sum of the storage capacities of all the storage areas by adding the storage capacity of an extended part of the relevant storage area recognized by the extension plan information 430 to the storage capacity calculated according to the formula (2) mentioned above for each individual storage area.

FIGS. 17(A) and 17(B) show configuration examples for the connectivity guarantee information 420 (FIG. 4c). The apparatus-to-be-introduced selecting program 522 (FIG. 5e) may use the connectivity guarantee information 420 obtained via the Internet 90 (FIG. 1) when selecting the integral apparatus to be introduced. The management computer 500 retains the obtained connectivity guarantee information 420 in the connectivity guarantee information retaining table 538 (FIG. 5e). Referring to FIG. 17, "◯" represents that the connectivity is guaranteed; and "X" represents that the connectivity is not guaranteed. Accordingly, FIG. 17 shows that the storage apparatus 100' cannot be used by the computer 300 (the connectivity is not guaranteed), but the storage apparatus 100" can be used by the computer 300 (the connectivity is guaranteed).

In this case, even if the integral apparatus to be introduced is the integral apparatus 10, a computer is the computer 300, the integral apparatus 10' exists in the computer system, and the storage apparatus 100' has an unused storage capacity, the computer 300 cannot use the unused storage capacity of the storage apparatus 100', so that it is necessary to prepare a new storage capacity for the computer 300. The apparatus-to-be-introduced selecting program 522 calculates the storage capacity in consideration of the above situation.

Specifically speaking, this connectivity guarantee information 420 is information indicating connectivity between a plurality of integral apparatuses (variations or series); and it is possible to find out whether or not access between computers and storage apparatuses of an introduced integral apparatus and computers and storage apparatuses of an integral apparatus to be introduced can be made, by using the connectivity guarantee information 420. Accordingly, this connectivity guarantee information 420 indicates the relationship between the introduced integral apparatus and the integral apparatus to be introduced and this information can be considered to bind the plurality of integral apparatuses together and organize the plurality of integral apparatuses as variations or series.

Figure 18:
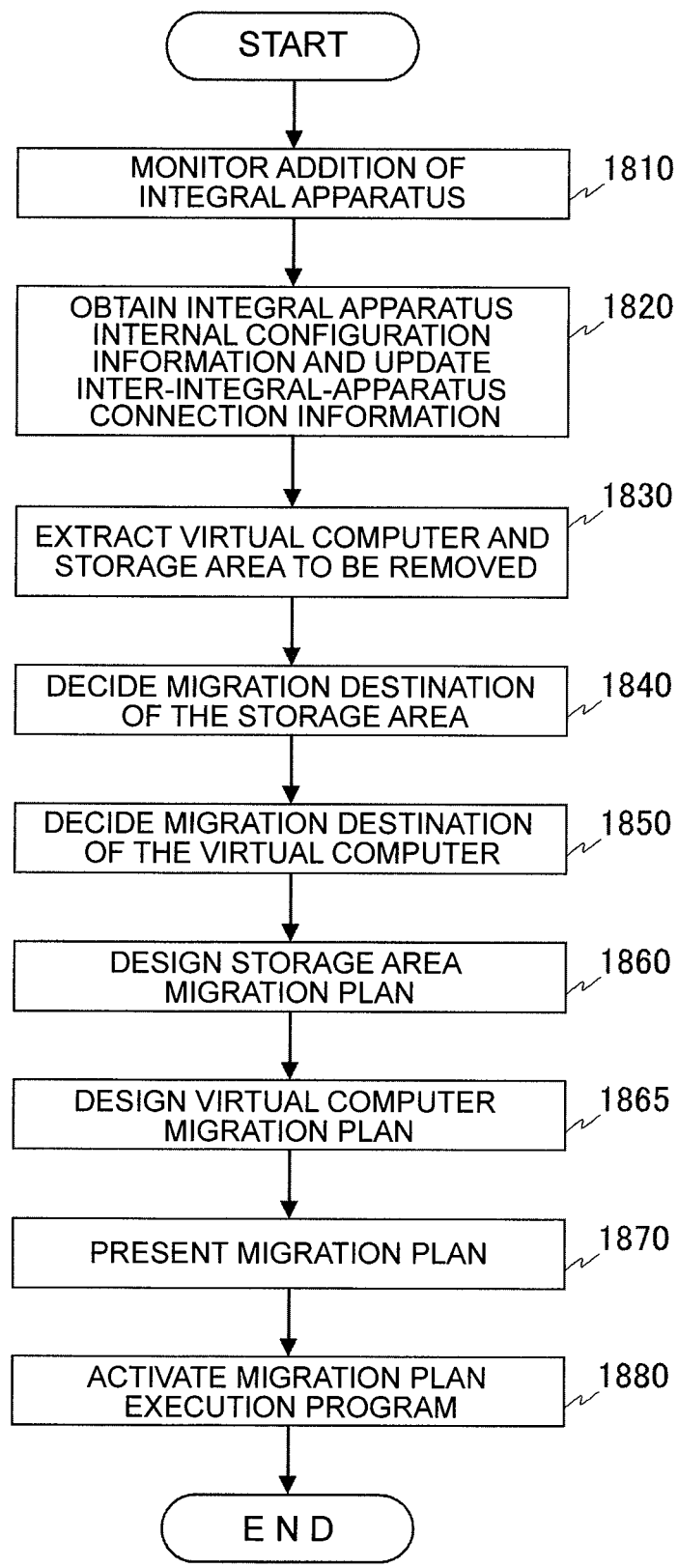
FIG. 18 is a flowchart illustrating a processing sequence for migration plan designing processing.

FIG. 18 shows a processing sequence for migration plan designing processing executed by the migration plan designing program 523 (FIG. 5e).

The migration plan designing program 523 monitors connection of a new integral apparatus to the computer system 1 (step 1810). If the migration plan designing program 523 then detects that a new integral apparatus is connected to the computer system 1, it proceeds to step 1820. When detecting the connection of a new integral apparatus, for example, an acquisition request for a network identifier (IP address)

issued by each apparatus/device of the integral apparatus when the added integral apparatus is activated may be used.

Next, the migration plan designing program 523 obtains the integral apparatus internal configuration information 404 (FIG. 4*c*) from each integral apparatus including the newly connected integral apparatus and updates the inter-integral-apparatus connection information 411 (FIG. 4*c*) stored in the inter-integral-apparatus connection information retaining table 532 (FIG. 5*e*) in the management computer 500 based on the obtained integral apparatus internal configuration information 404 (step 1820).

Subsequently, the migration plan designing program 523 refers to the connecting path information 410 (FIG. 4*c*) stored in the connecting path information retaining table 533 (FIG. 5*e*) and extracts the virtual computer(s) 322 and the storage area(s) included in the integral apparatus 10' to be removed (step 1830).

Furthermore, the migration plan designing program 523 decides a migration destination of the storage areas extracted in step 1830 by referring to the utilization rate information 412 (FIG. 4*c*) stored in the utilization rate information retaining table 534 (FIG. 5*e*) (step 1840). The migration plan designing program 523 also decides a migration destination of the virtual computers 322 extracted in step 1830 by referring to the utilization rate information 412 (step 1850).

Next, the migration plan designing program 523 refers to the inter-integral-apparatus connection information 411 (FIG. 4*c*) and designs a migration plan for the storage areas. Since the storage areas are migrated between the integral apparatuses (copying of data in the storage areas) via the connecting device 50, the number of storage areas to be migrated (copied) at the same time is limited, thereby inhibiting the influence on the execution of other virtual computers 322. The designed migration plan is stored in the migration plan retaining table 537 (FIG. 5*e*) (step 1860).

Subsequently, the migration plan designing program 523 refers to the inter-integral-apparatus connection information 411 and designs a migration plan 432 for the virtual computers 322 (step 1865). Since the virtual computers 322 are migrated between the integral apparatuses (particularly, copying of memories for the virtual computers 322 when instantly migrating the virtual computers) via the connecting device 50, the number of the virtual computers 322 to be migrated (whose memories are to be copied) at the same time is limited, thereby inhibiting the influence on the execution of other virtual computers 322. The designed migration plan is stored in the migration plan retaining table 537 (FIG. 5*e*).

Furthermore, the migration plan designing program 523 displays the designed migration plan on the output means of the management computer 500 and seeks the system administrator's approval (step 1870). The migration plan is intended to show the migration destination of each virtual computer 322 or storage area which is the migration source and indicate at which timing the migration should be started; and the migration plan is displayed on a screen of the management computer 500. Specifically speaking, the migration plan shows what date and time the migration of a virtual computer 322 operated on a computer for the integral apparatus to be removed to a virtual computer for a newly added or introduced integral apparatus should be started. Incidentally, the migration timing of the virtual computer 322 can be planned by avoiding time when a large number of processes are executed or, in a case of migration processing with heavy transfer load accompanied with the migration due to a large data amount in the storage area, by shifting time of other migration processing. Furthermore, step 1870 may be omitted and the migration plan may be executed immediately after designing the migration plan.

Specifically speaking, regarding the step in which the migration destination of the storage areas or the virtual computers 322 is decided by referring to the aforementioned utilization rate information 412 (FIG. 4*c*), storage areas or virtual computers are judged as migration destination candidates in descending order of the size of the available storage areas or computer power. Also, since an improvement rate of the storage area or computer power can be found by calculation using chronological information (for example, first-order approximation), if the improvement rate is equal to or more than a predetermined value, efficient migration can be realized by reducing the rank of the relevant storage area or virtual computer as the migration destination candidate.

Subsequently, the migration plan designing program 523 activates the migration plan execution program 524 (FIG. 5*e*) (step 1880) and then terminates this migration plan designing processing.

Incidentally, a latency policy may be considered when deciding the migration destination of the virtual computer in step 1850 of the above-described migration plan designing processing. If the latency policy "within the integral apparatus" is designated, the storage area to be used by the virtual computer 322 needs to be located in a storage apparatus of the same integral apparatus as the integral apparatus where a computer on which the relevant virtual computer 322 is executed exists. Therefore, the migration plan is designed so that the virtual computer 322 will be located in the computer for the same integral apparatus as the integral apparatus to which the relevant storage area is migrated.

Furthermore, the connectivity guarantee information 420 (FIG. 4*c*) obtained via the Internet 90 may be used when deciding the migration destination of the virtual computer 322. Specifically speaking, if connectivity between the storage apparatus, which is the migration destination of the storage area as decided in step 1840, and the computer which is executing the virtual computer 322 at present is not guaranteed, the migration plan designing program 523 recognizes a virtual computer, whose connectivity will no longer be guaranteed due to migration of the storage area, to be an object to be migrated and decides the migration destination of the virtual computer by referring to the utilization rate information 412 in step 1850.

Figure 19:
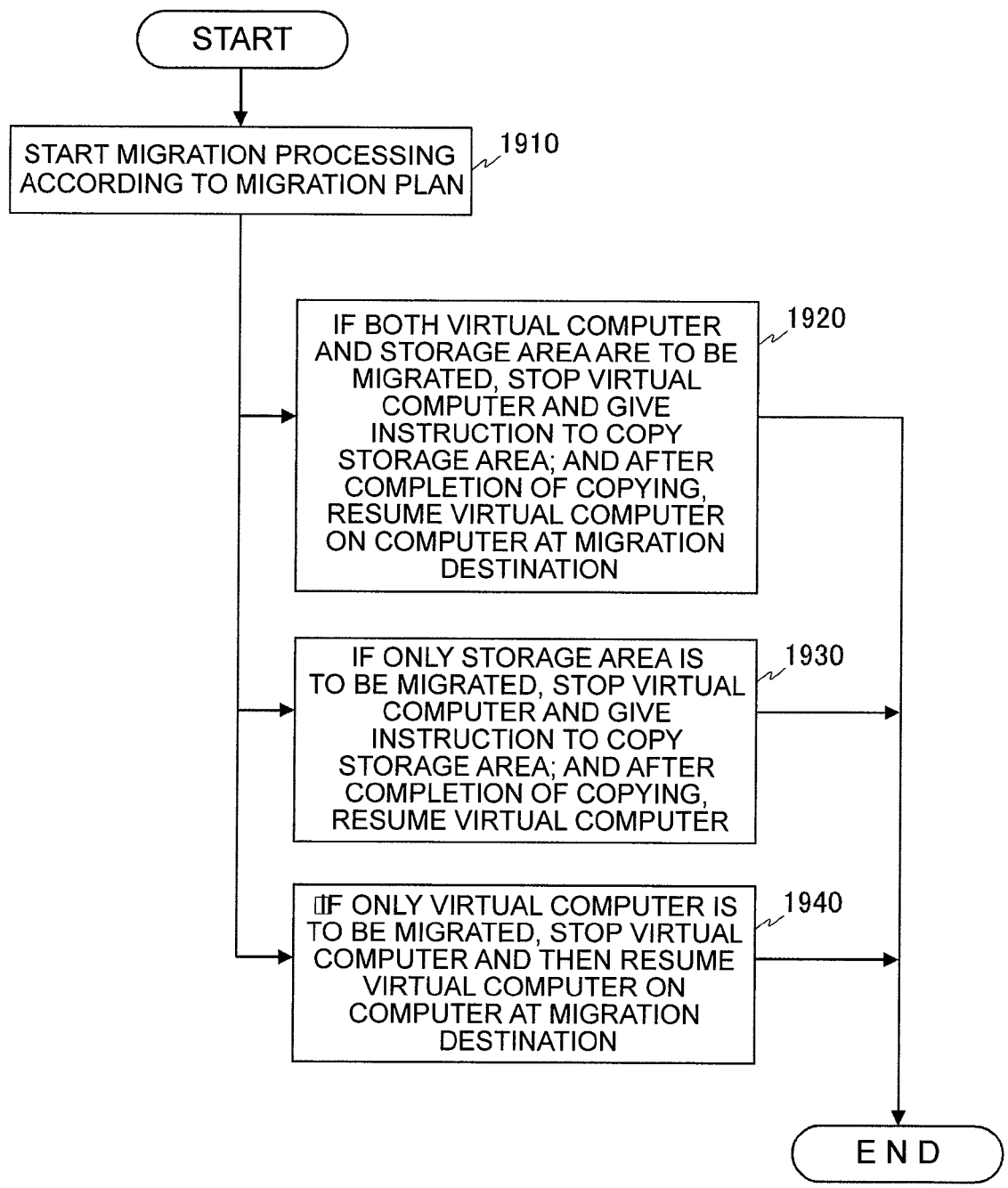
FIG. 19 is a flowchart illustrating a processing sequence for migration plan execution processing.

Meanwhile, FIG. 19 shows a processing sequence for migration plan execution processing executed by the migration plan execution program 524 (FIG. 5*e*).

The migration plan execution program 524 firstly starts processing for migrating the virtual computer(s) 322 and the storage area(s) according to the migration plan stored in the migration plan retaining table 537 (FIG. 5*e*) (step 1910).

If both the virtual computer 322 and the storage area are migrated, the migration plan execution program 524 temporarily stops the virtual computer 322 to be migrated (for example, the virtual computer 322 operating on the computer for the integral apparatus to be removed) and then gives an instruction to the data copy program 164 (FIG. 5*c*) for the integral apparatus to copy a storage area (for example, a storage area of the storage apparatus for the integral apparatus to be removed) to a storage area of the migration destination (for example, a storage area of a storage apparatus for a newly added integral apparatus). Subsequently, after receiving a copy completion notice from the data copy program 164 for the storage apparatus, the migration plan execution program 524 resumes the virtual computer 322 on the computer of the migration destination (for example, the computer for the newly added integral apparatus) (step 1920) and then terminates this migration plan execution processing.

On the other hand, if only the storage area is to be migrated, the migration plan execution program 524 temporarily stops the virtual computer 322 and then gives an instruction to the data copy program 164 for the storage apparatus to copy the storage area to a storage area of the migration destination. Subsequently, after receiving a copy completion notice from the data copy program 164 for the storage apparatus, the migration plan execution program 524 resumes the virtual computer 322 (step 1930) and then terminates this migration plan execution processing.

On the other hand, if only the virtual computer 322 is to be migrated, the migration plan execution program 524 temporarily stops the virtual computer 322 and then resumes the virtual computer 322 on the computer for the migration destination (step 1940), and then terminates this migration plan execution processing.

Incidentally, in step 1920, step 1930, and step 1940 of the above-described migration plan execution processing, processing of the virtual computer 322 is suspended while the storage apparatus is copying data from the migration source storage area to the migration destination storage area. However, in order to execute the virtual computer 322 even during copying, it is necessary to enable the execution of access to the storage areas during copying of the storage area.

If data reading to the migration destination storage area occurs according to this embodiment and copying to the migration destination storage area has not been completed, the data is read from the migration source storage area and transferred to the virtual computer 322; and if data writing to the migration destination storage area occurs, the data is written to both the migration destination storage area and the migration source storage area. As a result of the above-described processing, the virtual computer 322 can be resumed without waiting for the completion of copying. Therefore, stop time of the virtual computer 322 can be reduced.

If a storage area is migrated to a different storage apparatus during the above-described migration plan execution processing, a new storage area is created in the migration destination storage apparatus and data is copied from the storage area of the migration source storage apparatus in many cases. In this case, the new storage area created in the migration destination storage apparatus will have a new identification number (for example, a combination of a new Fibre Channel WWN and an LUN). If the identification number of the storage area is changed after resuming the temporarily stopped virtual computer 322, it is impossible to find the storage area, so that the resumption of the virtual computer 322 may fail. Therefore, if the identification number is changed, the migration plan execution program 524 sets a new identification number of the migration destination to the connecting device 200 and the virtual computer 322; and after setting the new identification number, the migration plan execution program 524 resumes the virtual computer 322. As a result, the virtual computer 322 can find the storage area after migration.

Furthermore, some storage apparatus has a function that has the migration destination of a different storage apparatus take over the identification number of the migration source storage area. So, if the storage apparatus has a function taking over the identification number, the migration plan execution program 524 may be equipped with a function executing the migration of the storage area which takes over the identification number. As a result, the processing for setting the identification number to the connecting device 200 and the virtual computer 322 may be omitted when resuming the virtual computer 322.

Furthermore, if copying between the storage areas is not supported between the migration source storage apparatus and the migration destination storage apparatus, the migration plan execution program 524 may search for a computer capable of accessing both the migration source storage apparatus and the migration destination storage apparatus and execute the data copy program on that computer.

In this case, the data copy program 164 reads data from the migration source storage area and writes the data to the migration destination storage area. After the completion of data copying, the data copy program 164 reports the termination of copying to the migration plan execution program 524. After receiving the copying termination report, the migration plan execution program 524 deletes the data copy program 164 from the computer. Incidentally, in this case, the migration plan execution program 524 may execute a plurality of data copy programs according to the migration plan.

If the virtual computer execution program 321 (FIG. 5b) includes the data copy program, the migration plan execution program 524 may use the data copy program included in the virtual computer execution program 321.

(2) Second Embodiment

The first embodiment has described the case where a storage area is directly accessed from the virtual computer 322. This embodiment will described migration in another connection form.

Figure 20:
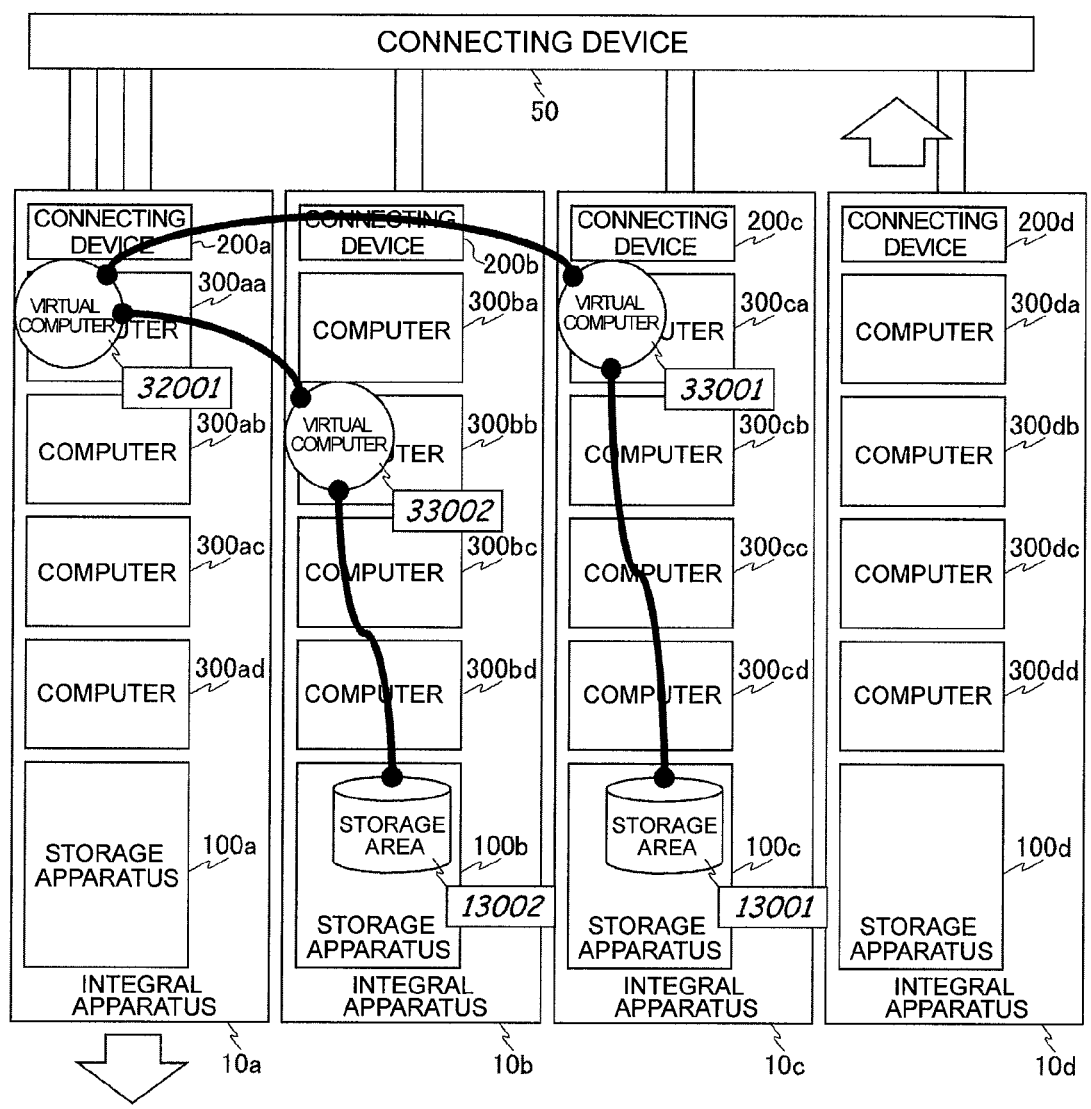
FIG. 20 is a block diagram showing a configuration example for a computer system according to a second embodiment.

FIG. 20 shows a computer system constructed by using four integral apparatuses 10 according to this embodiment and FIG. 21 shows a configuration example for the connecting path information 410 (FIG. 4c) in this computer system.

A virtual computer 32001 on a computer 300aa uses a storage area 13001 in a storage apparatus 100c via a virtual computer 33001 on a computer 300ca and a storage area 13002 in a storage apparatus 100b via a virtual computer 33002 on a computer 300bb. In this embodiment, two virtual computers in one tier are used between the virtual computer 32001 and the storage areas, but this embodiment can be implemented with the configuration of m virtual computers in n tiers (where "n" and "m" are arbitrary). The virtual computers located between the virtual computer 32001 and the storage areas may perform a file service such as NFS or CIFS. Consequently, the virtual computer 32001 will be able to write data to the storage areas 13001, 13002 according to NFS or CIFS protocol. Alternatively, Web servers may be executed. As a result, the virtual computer 32001 can assign the processing to a number of Web servers and thereby distribute processing load of enormous amounts of Web processing.

If the integral apparatus 10a is to be removed and an integral apparatus 10d is to be added with respect to the connecting path information 410 shown in FIG. 21, the migration plan designing program 523 designs a migration plan to, for example, migrate the virtual computer 32001, which is being executed on the integral apparatus 10a to be removed, to the integral apparatus 10d to be added. The migration plan execution program 524 temporarily stops the virtual computer 32001 and then resumes the virtual computer 32001 on a computer for the integral apparatus 10d which is the migration destination.

A coexistence policy can be set in this embodiment. If a policy stating "coexistence impossible" is designated as the coexistence policy, the migration plan designing program 523 designs a migration plan so that the virtual computer 32001, the virtual computer 33001, and the virtual computer 33002 will be executed on different integral apparatuses. Incidentally, if the coexistence policy is set, whether the coexistence should be made impossible on an integral apparatus basis or on a computer basis may be set to be selectable; and the details of the coexistence policy may be described such as "coexistence within the computer is impossible" or "coexistence within the integral apparatus is impossible."

Furthermore, if the integral apparatus 10*b* is to be removed and the integral apparatus 10*d* is to be added with respect to the connecting path information 410 shown in FIG. 21, the migration plan designing program 523 designs a migration plan to, for example, migrate the virtual computer 33002, which is being executed in the integral apparatus 10*b* to be removed, to the integral apparatus 10*d* to be added and migrate the storage area 13002 for the integral apparatus 10*b* to be removed to the integral apparatus 10*d* to be added.

Then, the migration plan execution program 524 temporarily stops the virtual computer 33002; and the migration plan execution program 524 creates a new storage area (the storage area 13012) in the migration destination storage apparatus 100*d* and gives an instruction to the storage apparatus 100*b* to copy data. After receiving a copy completion notice, the migration plan execution program 524 resumes the virtual computer 33002 on a computer for the integral apparatus 10*d* which is the migration destination. The migration execution plan program 524 may give an instruction to the virtual computer 32001 to temporarily stop access to the virtual computer 33002 while migrating the virtual computer 33002. In this case, the virtual computer 32001 assigns access to another virtual computer (the virtual computer 33001).

(3) Third Embodiment

This embodiment will describe migration in a form where another storage apparatus is connected via a storage apparatus.

Figure 22:
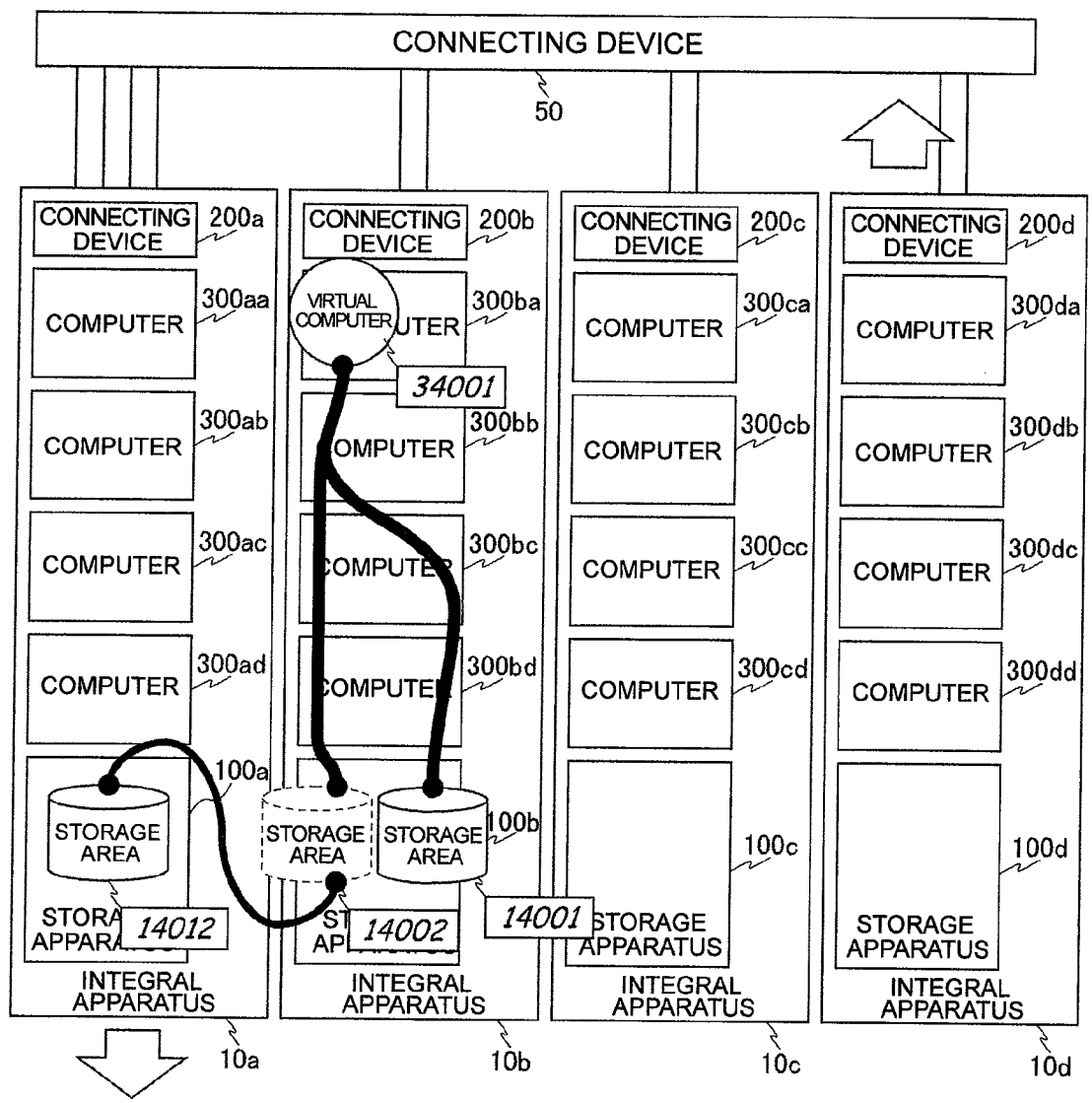
FIG. 22 is a block diagram showing a configuration example for a computer system according to a third embodiment.

FIG. 22 shows a computer system constituted from four integral apparatuses 10 according to this embodiment and FIG. 23 shows a configuration example for the connecting path information 410 according to this embodiment.

A virtual computer 34001 on a computer 300*ba* uses a storage area 14001 in a storage apparatus 100*b* and a storage area 14012 in a storage apparatus 100*a* via a virtual storage area 14002 in the storage apparatus 100*b*. The storage apparatus 100 can use the capacity of other storage apparatuses by means of the external storage apparatus access program 161.

Data written to the virtual storage area 14002 is actually written to the storage area 14012 in the storage apparatus 100*a* by the external storage apparatus access program 161. Also, regarding data reading from the virtual storage area 14002, data is actually read from the storage area 14012 in the storage apparatus 100*a* and transferred to the virtual computer. Response time will vary between a case of access to the storage apparatus 14001 from the virtual computer 34001 and a case of access to the storage apparatus 14002.

If the integral apparatus 10*a* is to be removed and the integral apparatus 10*d* is to be added with respect to the connecting path information shown in FIG. 23, the migration plan designing program 523 designs a migration plan to, for example, migrate the storage area 14012 in the integral apparatus 10*a* to be removed to the integral apparatus 10*d* to be added. The migration plan execution program 524 creates a new storage area (which will be the storage area 14013) in the migration destination storage apparatus 100*d* and gives an instruction to copy data to the data copy program 164 for the storage apparatus 100*b*. Incidentally, since the storage apparatus 100*b* can recognize the storage apparatuses 100*a*, 100*d*, it is assumed that the storage apparatus 100*b* has the copy program 164.

After receiving a copy completion notice, the migration plan execution program 524 notifies the storage apparatus 100*b* of a change of the storage area. The storage apparatus 100*b* which has received the change notice connects the virtual storage area 14002 to the storage area 14013. The migration plan designing program 523 updates the connecting path information. The storage area 14012 can be migrated without temporarily stopping the virtual computer 34001 by using the virtual storage area 14002.

Incidentally, in order to continue executing the virtual computer during copying, it is necessary to make it possible to access the virtual storage area even during copying of the storage area. If data reading to the migration destination storage area occurs and copying to the migration destination storage area has not been completed, the relevant data is read from the migration source storage area and transferred to the virtual computer. If data writing to the migration destination storage area occurs, the relevant data is written to both the migration destination storage area and the migration source storage area. As a result of the above-described processing, it is possible to continue executing the virtual computer even during copying.

A storage tier policy can be set in this embodiment. If "Tier1" is designated as the storage tier policy, the migration plan designing program 523 designs a migration plan to migrate the storage area to an integral apparatus in which the virtual computer is being executed. If "Tier2" is designated as the storage tier policy, the migration plan designing program 523 designs a migration plan to migrate the storage area to a storage apparatus in an integral apparatus different from the integral apparatus in which the virtual computer 322 is being executed. Designation of "Tier2" as the storage tier policy can broaden options for the migration destination and improve the utilization rate of surplus storage capacity in the computer system.

Furthermore, a connecting path may be changed as triggered by migration. If the integral apparatus 10*a* is to be removed and the integral apparatus 10*d* is to be added with respect to the path information 410 shown in FIG. 23, the migration plan designing program 523 designs a migration plan to, for example, migrate the storage area 14012 in the integral apparatus 10*a* to be removed 10*a* to the integral apparatus 10*d* to be added.

Furthermore, the migration plan execution program 524 temporarily stops the virtual computer 322 to be migrated, creates a new storage area (which will be the storage area 14013) in the migration destination storage apparatus 100*d*, and gives an instruction to the storage apparatus 100*d* to copy data to the storage apparatus 100*d*. After receiving a copy completion notice, the migration plan execution program 524 makes the setting so that the connecting device and the virtual computer 34001 will use the storage area 14013 instead of the storage area 14002; and after making the setting, the migration plan execution program 524 resumes the virtual computer 322. Incidentally, if the storage apparatus 100*d* can take over the identification number of the migration source storage area, the identification number of the storage apparatus 100*b* may be assigned to the storage area newly created in the storage apparatus 100*d*. If the identification number is assigned, processing for setting the identification number to the connecting device 200 and the virtual computer 322 may be omitted when resuming the virtual computer 322.

(4) Fourth Embodiment

This embodiment will describe a change of a connecting path by using the connectivity guarantee information 420 (FIG. 4*c*).

Figure 24:
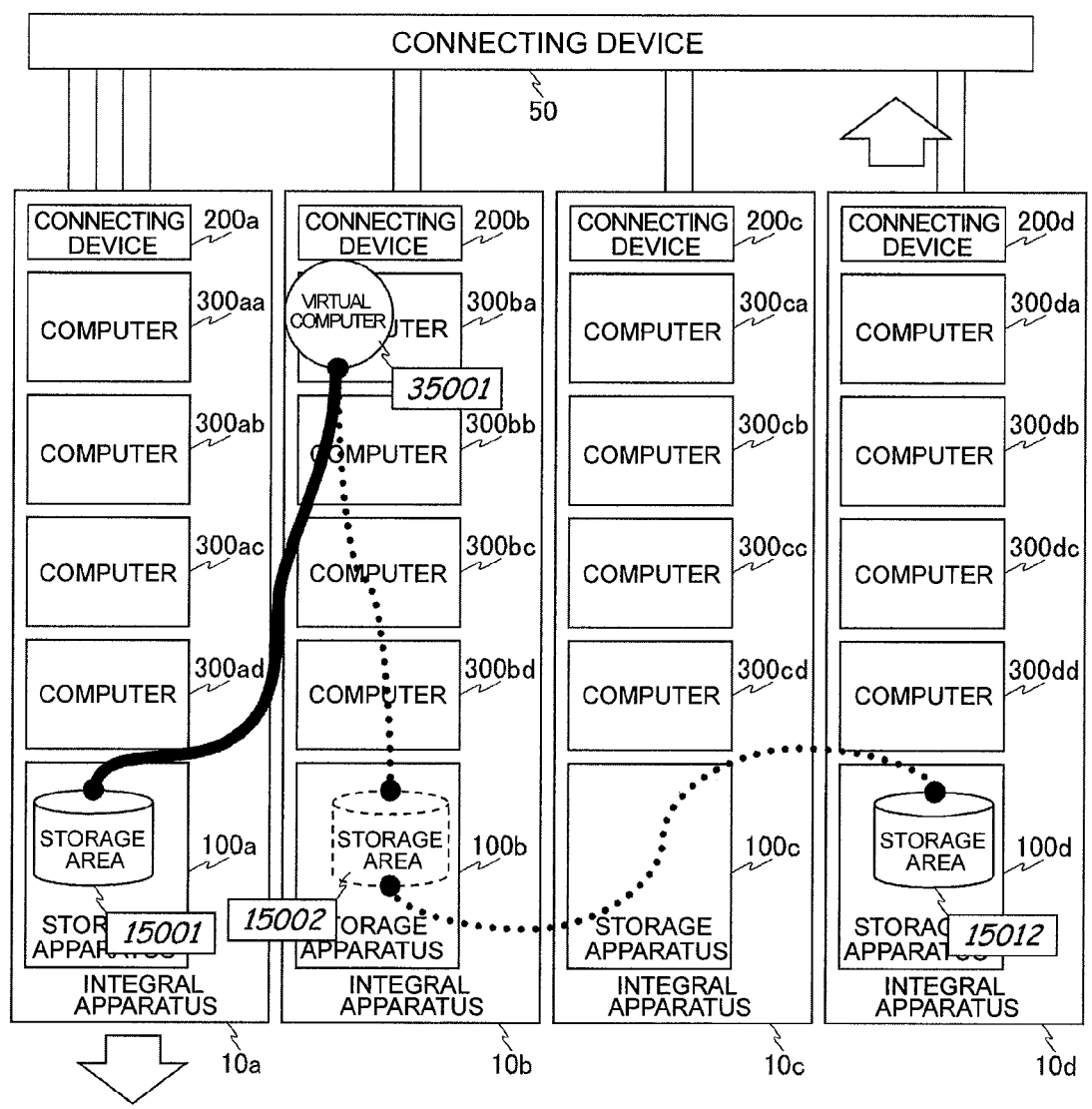
FIG. 24 is a block diagram showing a configuration example for a computer system according to a fourth embodiment.
Figure 25:
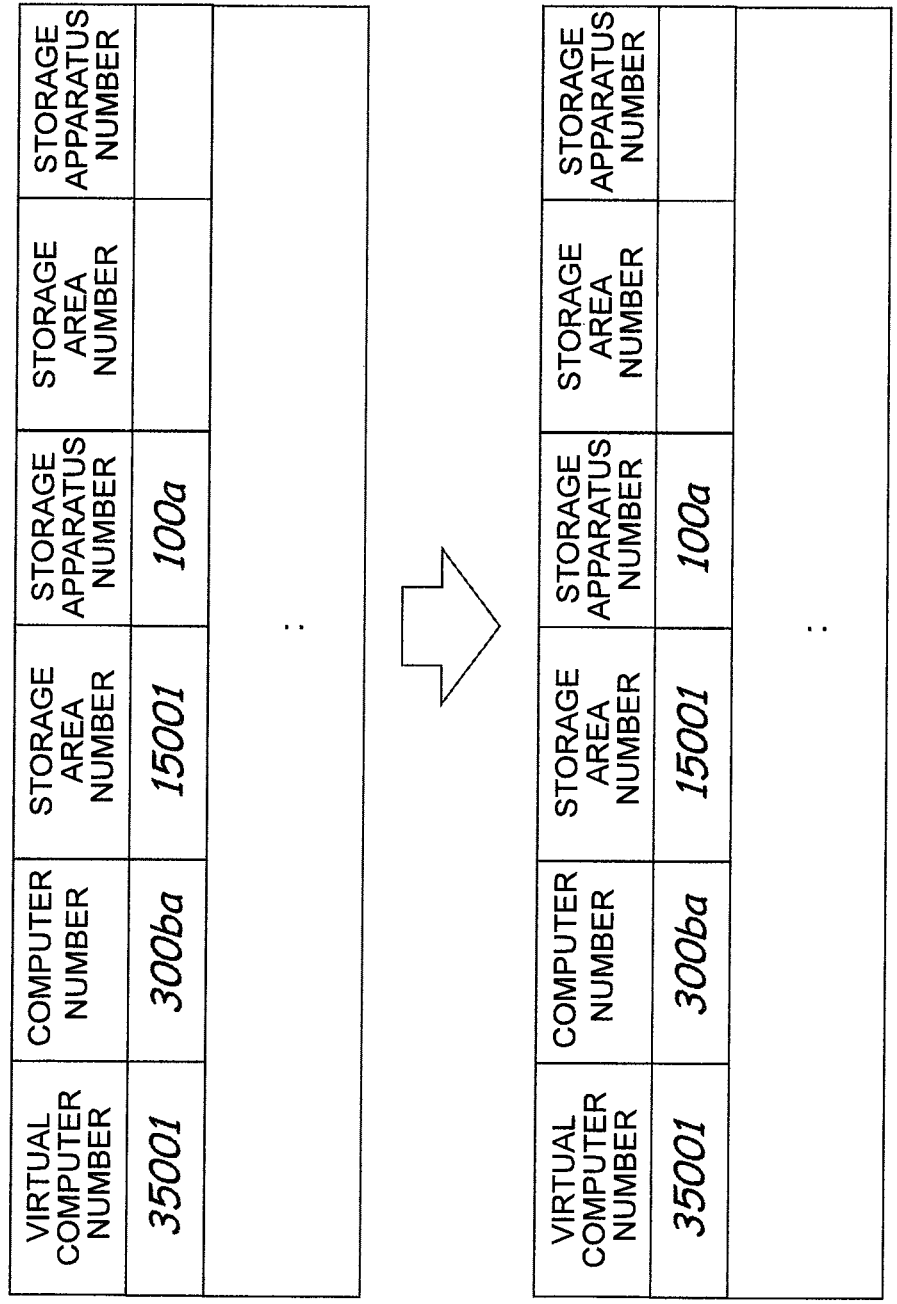
FIG. 25 is a conceptual diagram showing a configuration example for connecting path information according to the fourth embodiment.

FIG. 24 shows a computer system constituted from four integral apparatuses 10 according to this embodiment and FIG. 25 shows a configuration example for the connecting path information 410 according to this embodiment. Also, FIGS. 26(*a*) and 26(*b*) show configuration examples for the connectivity guarantee information 420 according to this embodiment.

A virtual computer 35001 on a computer 300*ba* uses a storage area 15001 in a storage apparatus 300*a*. The following explanation will be given about a case where an integral apparatus 10*a* is removed and an integral apparatus 10*d* is added with regard to the connecting path information 410 shown in FIG. 25. In this case, the migration plan designing program 523 (FIG. 5*e*) refers to the connectivity guarantee information 420. If a storage area is created in the storage apparatus 100*d*, connectivity between the computer 300*b* and the storage apparatus 100*d* is not guaranteed according to the connectivity guarantee information 420 shown in FIG. 26. Therefore, the computer 300*b* cannot be used. However, since connectivity between the computer 300*b* and the storage apparatus 100*b* is guaranteed, the computer 300*b* can be used. Also, connectivity between the storage apparatus 100*b* and the storage apparatus 100*d* is guaranteed. In this case, the migration plan designing program 523 designs the following migration plan.

Specifically speaking, the migration plan designing program 523 firstly creates a new storage area 15012 in the storage apparatus 100*d* and copies data of the storage area 15001. The migration plan designing program 523 then creates a new virtual storage area 15002 in the storage apparatus 100*b* and connects it with the storage area 15012 (by using the external storage apparatus access program 161).

Subsequently, the migration plan designing program 523 makes the setting so that the connecting device and the virtual computer 35001 will use the storage area 14013 instead of the storage area 14002; and after making the setting, the migration plan designing program 523 resumes the virtual computer 322. Incidentally, if the storage apparatus 100*b* can take over the identification number of the migration source storage area, the identification number of the storage apparatus 100*b* may be assigned to the storage area newly created in the storage apparatus 100*d*. If the identification number is assigned, it is unnecessary to perform processing for setting the identification number to the virtual computer 322 when resuming the connecting device 200 and the virtual computer 322.

As a result of the above-described configuration and processing, an integral apparatus to be added or introduced can be automatically selected when sequentially updating an old integral apparatus to a new one in a computer system constructed by using integral apparatuses. Therefore, it is possible to reduce the load imposed on the person in charge of operation or the system administrator. Furthermore, the virtual computer and the storage area can be automatically migrated when adding and introducing an integral apparatus or removing an old apparatus. So, it is possible to reduce the load imposed on the person in charge of operation or the system administrator.

(5) Fifth Embodiment

This embodiment will describe a case where an integral computer is constructed by using a connecting device, a storage apparatus, and blade-type computers (hereinafter simply referred to as the "blade computers").

Figure 27:
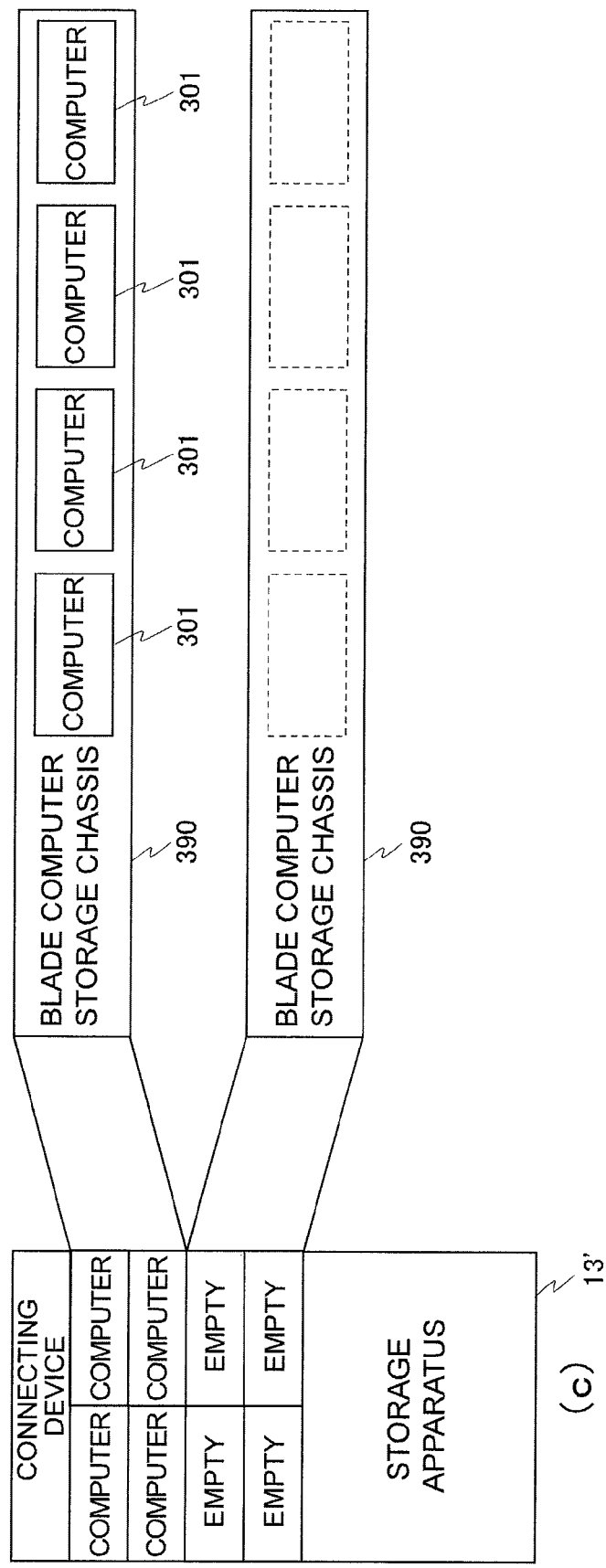
FIG. 27 is a conceptual diagram explaining a computer in a computer system according to a fifth embodiment.

FIG. 27 shows a configuration example for an integral apparatus in which the integral apparatus is constructed by using blade computers as computers 301. The blade computers 301 are stored in a blade computer storage chassis 390 and incorporated into the integral apparatus. In this situation, only the blade computer chassis 390 which does not store any blade computer 301 may be stored.

Figure 28:
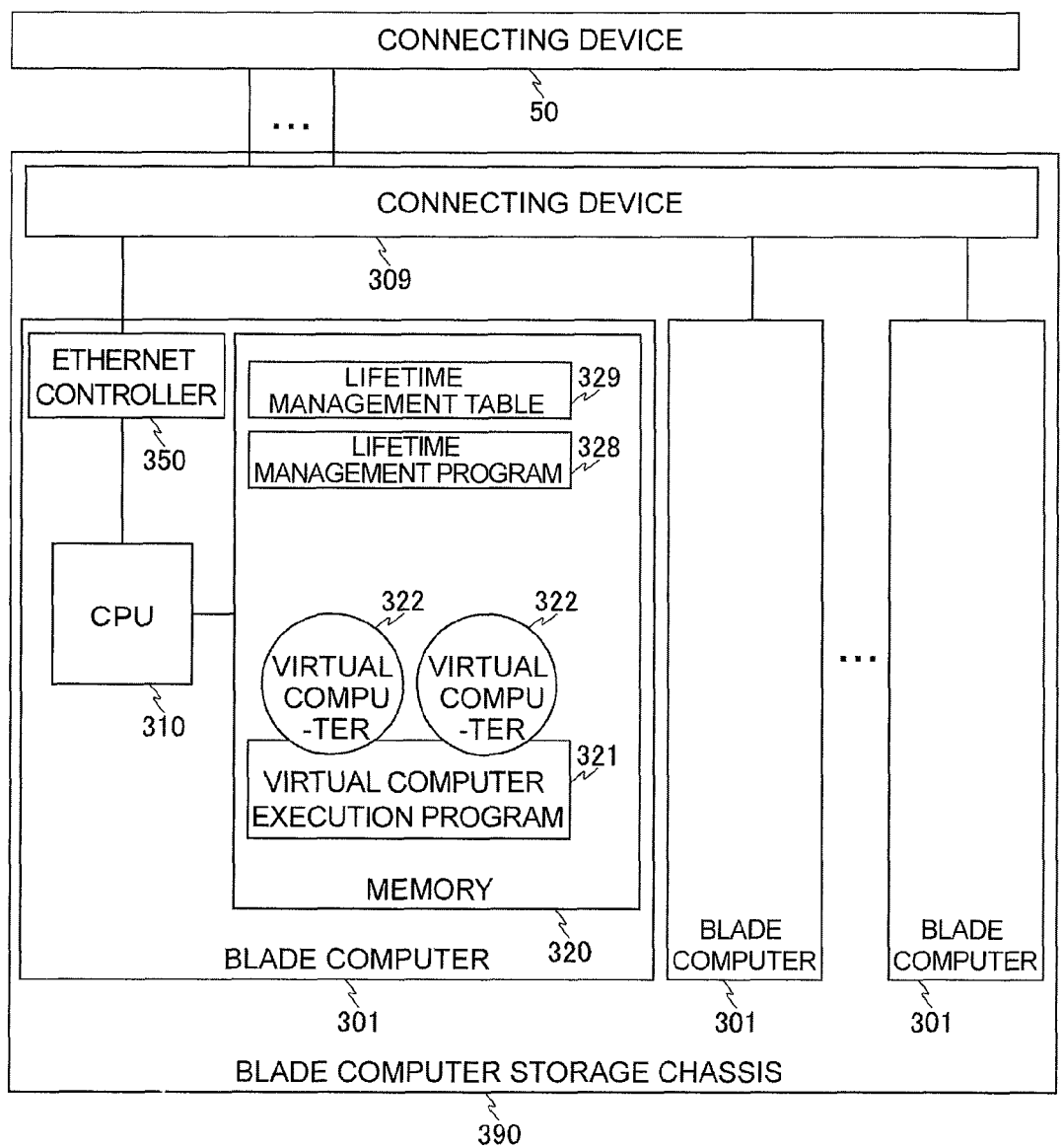
FIG. 28 is a block diagram showing a configuration example for a computer system according to a fifth embodiment.

FIG. 28 shows the configuration of the blade computer 301 and the blade computer storage chassis 390. The blade computer 301 is connected to the connecting device 50 in the integral apparatus via a connecting device 309 in the blade computer storage chassis 390. However, each blade computer 301 in the blade computer storage chassis 390 may be directly connected to the connecting device 50 without using the connecting device 309.

If the management computer 500 detects that a new blade computer 301 is connected to the blade computer storage chassis 390, it updates the integral apparatus internal configuration information 404 (FIG. 4*c*) about that integral apparatus. When implementing this embodiment, the configuration in which the management computer 501 is provided within the integral apparatus as shown in FIG. 7*b* is favorable. The management computer 501 in the integral apparatus updates the integral apparatus internal configuration information 404 and notifies the management computer 500 of a configuration change.

(6) Other Embodiments

Incidentally, each processing sequence shown in the first to fifth embodiments described above can be implemented by hardware as a processing unit for executing such processing sequence by means of formation of integrated circuits. Programs may be stored in advance in a storage apparatus in a computer or in an external storage apparatus or be introduced to the external storage apparatus, whenever needed, via attachable/detachable storage media or communication media (such as a wired, radio, optical, or other network, or a carrier wave or a digital signal on the network).

INDUSTRIAL APPLICABILITY

This invention can be used in a wide variety of computer systems equipped with integral apparatuses.

REFERENCE SIGNS LIST

10 to 14 Integral apparatuses
50 Connecting device
100 Storage apparatus
101 SSD
200 Connecting device
300 Computer
322 Virtual computer
401 Lifetime information
404 Integral apparatus internal configuration information
410 Connecting path information
411 Inter-integral-apparatus connection information
412 Utilization rate information
420 Connectivity guarantee information
421 Internal configuration information about an integral apparatus to be introduced
430 Extension plan information
431 Introduced apparatus information
432 Migration plan 500 Management computer
501 Management computer
521 Apparatus-to-be-removed selecting program
522 Apparatus-to-be-introduced selecting program
523 Migration plan designing program
524 Migration plan execution program
530 Lifetime information retaining table
531 Integral apparatus internal configuration information retaining table
532 Inter-integral-apparatus connection information retaining table
533 Connecting path information retaining table
534 Utilization rate information retaining table
535 Internal configuration information retaining table for an integral apparatus to be introduced
536 Extension plan information retaining table
537 Migration plan retaining table
538 Connectivity guarantee information retaining table

The invention claimed is:

1. A management computer for managing a storage system comprising:
 a high-level connecting device coupled to the management computer; and
 an integral apparatus coupled to the high-level connecting device;
 a computer for executing various processing sequences according to implemented application software;
 a storage apparatus from or to which the computer reads or writes data; and
 a low-level connecting device for connecting the computer, the storage apparatus, and the high-level connecting device;
 wherein the computer, the storage apparatus, and the low-level connecting device may be introduced to, or removed from, the storage system,
 wherein the management computer stores:
  integral apparatus internal configuration information indicating a configuration of the integral apparatus;
  configuration information about an integral apparatus to be introduced, and indicates a configuration of an integral apparatus that may possibly be introduced to the storage system; and
  utilization rate information indicating the content of usage of the integral apparatus; and
 is configured to:
  obtain connectivity guarantee information indicating whether a connection between the computer and the storage apparatus is guaranteed or not;
  select the integral apparatus to be introduced to the storage system by referring to the integral apparatus internal configuration information, the configuration information about the integral apparatus to be introduced, the connectivity guarantee information, and the utilization rate information; and
  output information about an integral apparatus to be removed and the selected integral apparatus to be introduced.

2. The management computer according to claim 1, further comprising:
 lifetime information indicating a lifetime of the integral apparatus, and
 being configured to refer to the lifetime information for selection of the integral apparatus to be removed from the storage system, and output the information about the selected integral apparatus to be removed.

3. The management computer according to claim 2, further comprising:
 extension plan information indicating the content of newly required equipment; and
 being configured to select the integral apparatus to be introduced by referring to the extension plan information.

4. The management computer according to claim 3,
 wherein the utilization rate information retains information for chronologically indicating the content of usage of the integral apparatus, and
 the management computer is configured to calculate a performance improvement rate of the required equipment based on the utilization rate information, and refer to the performance improvement rate for the selection of the integral apparatus to be introduced.

5. The management computer according to claim 4,
 wherein the integral apparatus internal configuration information and the configuration information about the integral apparatus to be introduced include a model number of the required equipment, a number of connections for external connection, performance, and topology information.

6. The management computer according to claim 5,
 wherein the computer operates a virtual computer,
 wherein the storage apparatus provides the virtual computer with a storage area,
 wherein the management computer is configured to retain connecting path information indicating a correspondence relationship between the virtual computer and the storage area, migrate the virtual computer, which is operating in the integral apparatus, and the storage area, by referring to the connecting path information, and output a result of the migration.

7. The management computer according to claim 6,
 wherein the connecting path information includes a latency policy indicating whether or not it is necessary to have the virtual computer and the storage area operate in the same integral apparatus.

8. The management computer according to claim 7,
 wherein the management computer migrates the virtual computer and the storage area by referring to the connectivity guarantee information.

9. The management computer according to claim 8,
 wherein the utilization rate information retains the information for chronologically indicating the content of usage of the integral apparatus, and
 wherein the management computer calculates the performance improvement rate of the required equipment based on the utilization rate information, and refers to the performance improvement rate for the migration of the virtual computer and the storage area.

* * * * *